July 11, 1950  G. C. SOUTHWORTH  2,514,678
WAVE GUIDE SYSTEM
Filed June 30, 1942  13 Sheets-Sheet 1

INVENTOR
G.C. SOUTHWORTH
BY
N. A. Ewing
ATTORNEY

July 11, 1950  G. C. SOUTHWORTH  2,514,678
WAVE GUIDE SYSTEM
Filed June 30, 1942  13 Sheets-Sheet 2

INVENTOR
G. C. SOUTHWORTH
BY
N. A. Ewing
ATTORNEY

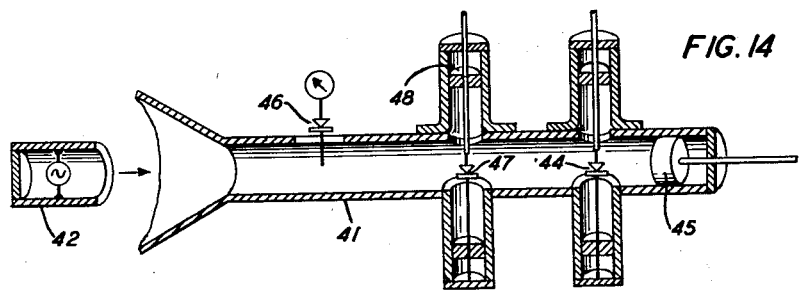
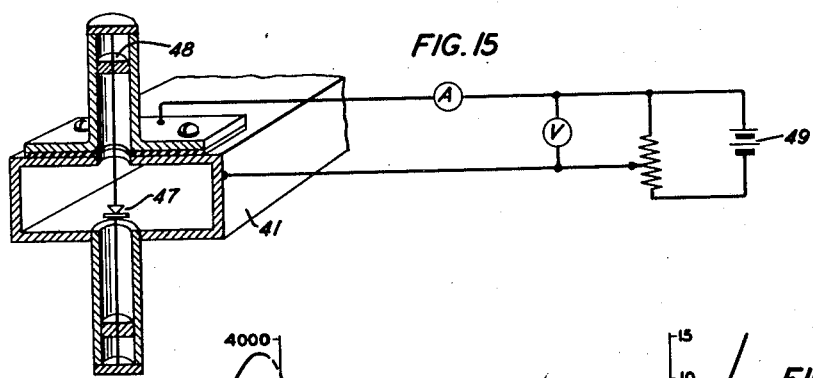
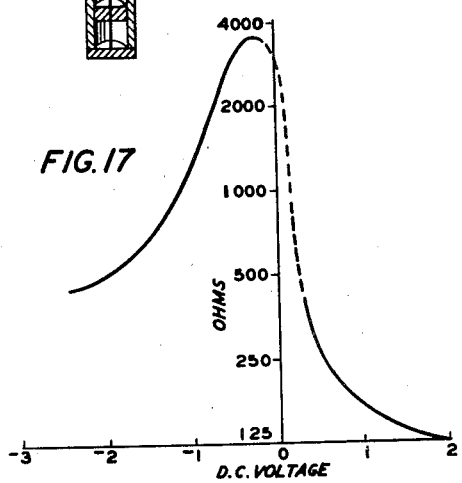
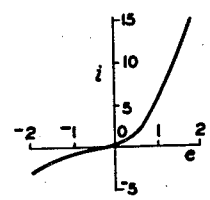
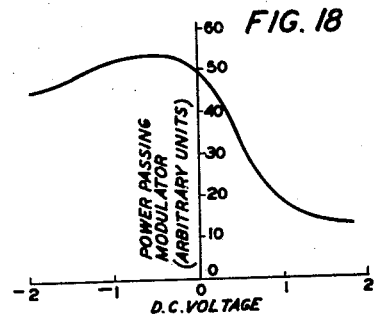
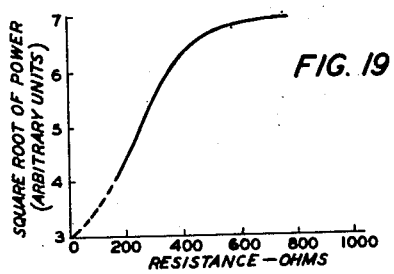

July 11, 1950 G. C. SOUTHWORTH 2,514,678
WAVE GUIDE SYSTEM
Filed June 30, 1942 13 Sheets-Sheet 4

INVENTOR
G. C. SOUTHWORTH
BY
N. A. Ewing
ATTORNEY

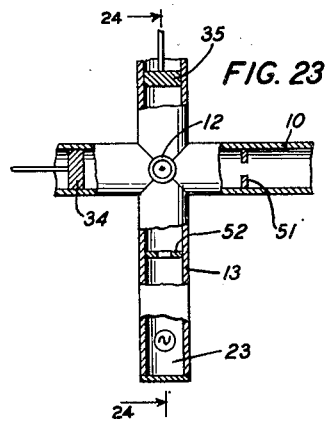
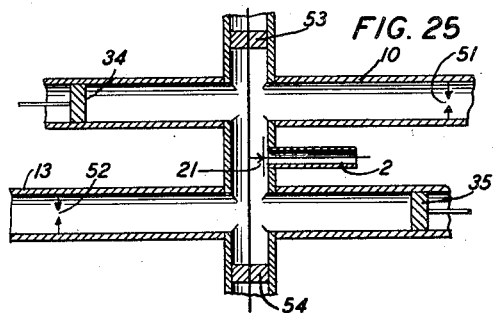
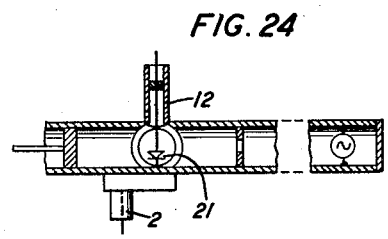
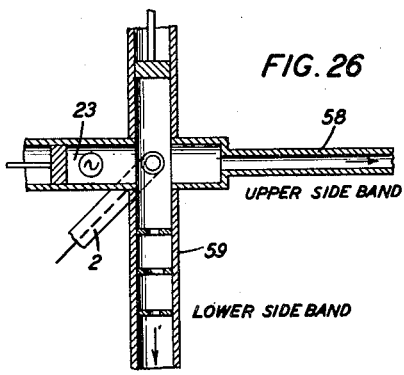
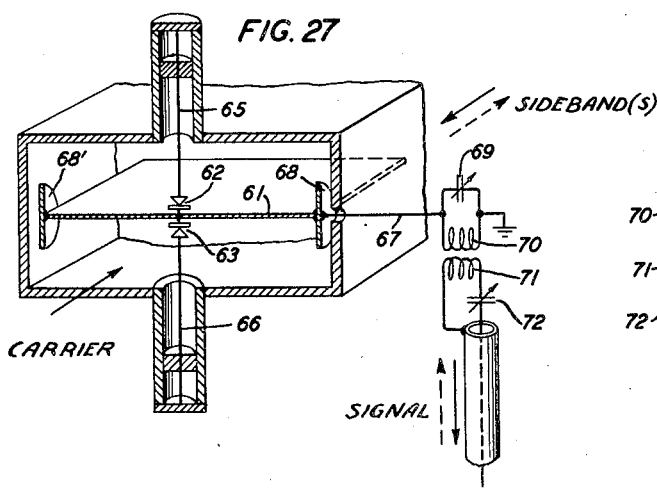
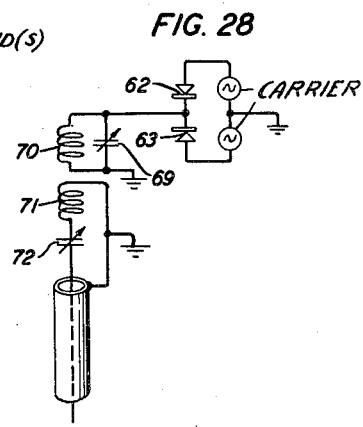

July 11, 1950  G. C. SOUTHWORTH  2,514,678
WAVE GUIDE SYSTEM
Filed June 30, 1942  13 Sheets-Sheet 6

INVENTOR
G. C. SOUTHWORTH
BY
N. A. Ewing
ATTORNEY

July 11, 1950     G. C. SOUTHWORTH     2,514,678
WAVE GUIDE SYSTEM
Filed June 30, 1942     13 Sheets-Sheet 7
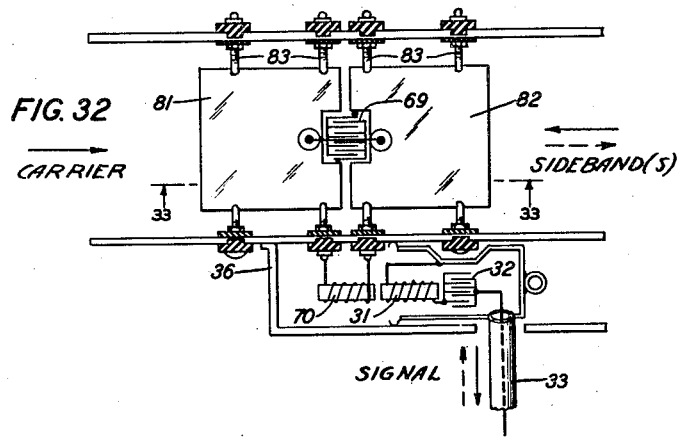
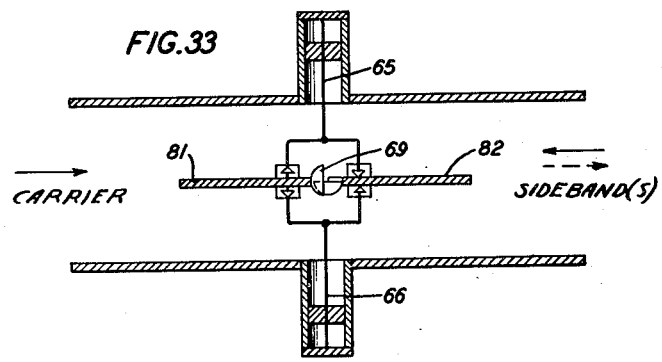
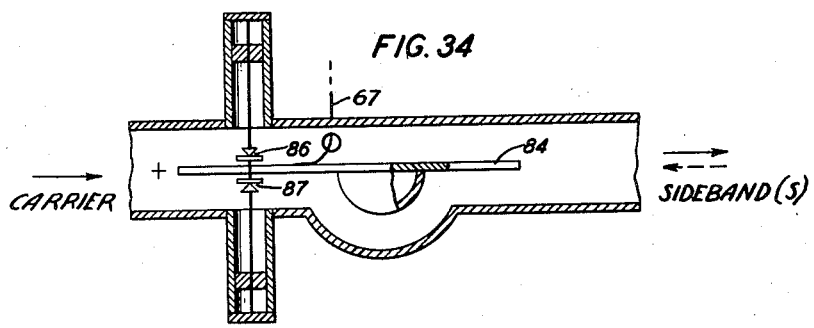
INVENTOR
G. C. SOUTHWORTH
BY
ATTORNEY

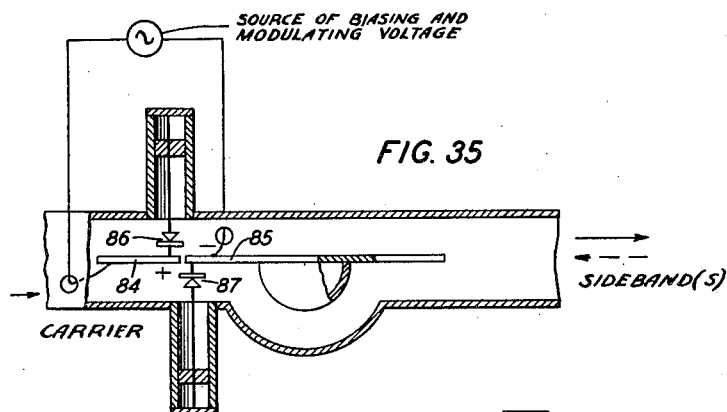
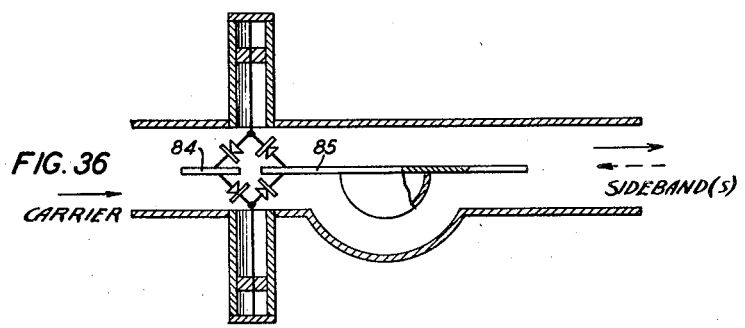
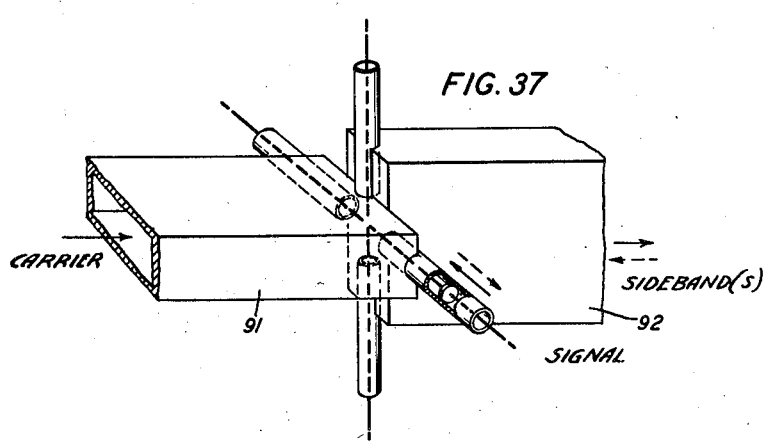

July 11, 1950 G. C. SOUTHWORTH 2,514,678
WAVE GUIDE SYSTEM
Filed June 30, 1942 13 Sheets-Sheet 9

INVENTOR
G.C.SOUTHWORTH
BY
ATTORNEY

July 11, 1950    G. C. SOUTHWORTH    2,514,678
WAVE GUIDE SYSTEM
Filed June 30, 1942    13 Sheets-Sheet 10

INVENTOR
G. C. SOUTHWORTH
BY
ATTORNEY

July 11, 1950 G. C. SOUTHWORTH 2,514,678
WAVE GUIDE SYSTEM
Filed June 30, 1942 13 Sheets-Sheet 11
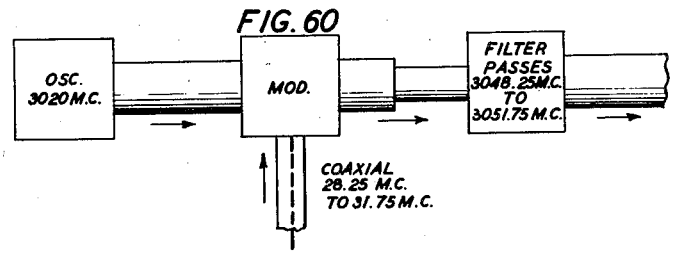
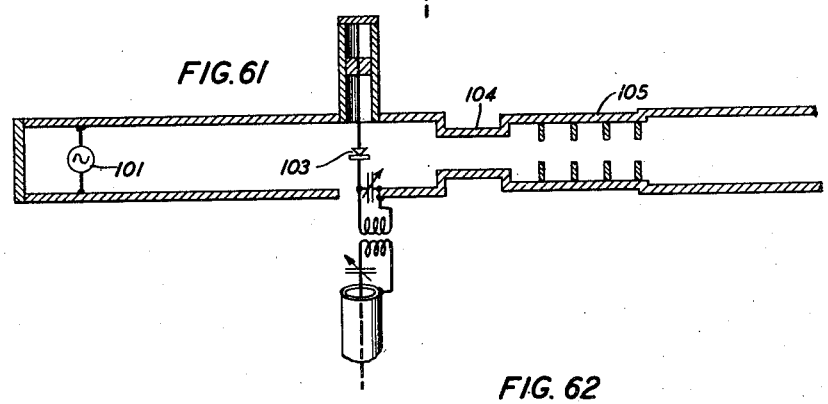
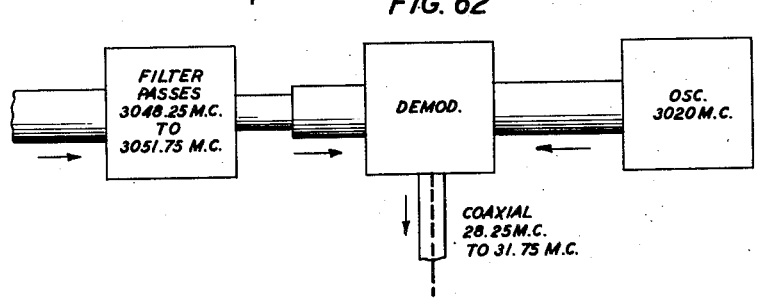
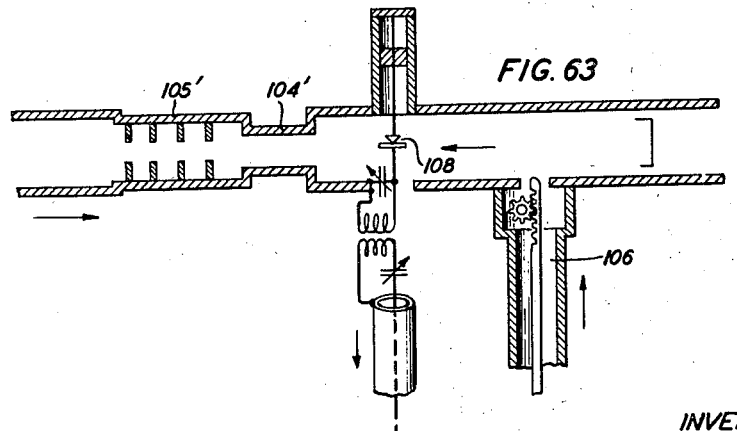
INVENTOR
G. C. SOUTHWORTH
BY
N. D. Ewing
ATTORNEY July 11, 1950 G. C. SOUTHWORTH 2,514,678
WAVE GUIDE SYSTEM
Filed June 30, 1942 13 Sheets-Sheet 12

INVENTOR
G. C. SOUTHWORTH
BY
*N. A. Ewing*
ATTORNEY

INVENTOR
G.C. SOUTHWORTH
BY
ATTORNEY

Patented July 11, 1950

2,514,678

UNITED STATES PATENT OFFICE 2,514,678

WAVE GUIDE SYSTEM

George C. Southworth, Red Bank, N. J., assignor to Bell Telephone Laboratories, Incorporated, New York, N. Y., a corporation of New York Application June 30, 1942, Serial No. 449,102

57 Claims. (Cl. 332—54)

This invention relates primarily to the intermodulation of electric waves and more particularly to modulators or "frequency converters" adapted to effect frequency translation of signals and the like in systems employing wave frequencies of the order of a billion cycles per second or higher. The present application is in part a continuation of my application Serial No. 359,643, filed October 4, 1940 since abandoned, and of my application Serial No. 385,054, filed March 25, 1941 (United States Patent No. 2,460,109, January 25, 1949), the disclosures of which are to be deemed incorporated herein. Mention is made also of my prior applications, Serial No. 104,524, filed October 7, 1936 (United States Patent No. 2,153,728) and Serial No. 223,424, filed August 6, 1938 (United States Patent No. 2,253,589), the disclosures of which are of some interest with respect to certain features of the invention as disclosed and claimed herein.

An object of the present invention is to improve the efficiency with which intermodulation is effected and more especially to conserve or utilize most effectively the ultra high frequency wave power involved.

Another object is to improve and simplify the construction and adjustment of modulators adapted for ultra high frequency waves.

Still another and more particular object is to provide improved modulators adapted for use where there are involved two ultra high frequencies, such as a beating or carrier frequency and a side-band frequency, that are substantially different. A further object is to improve the performance of modulators with respect to the relative width of signal frequency band that can be effectively employed.

More generally my invention aims at improving frequency converters of the various types that would be required for example in a multiplex carrier system employing hollow pipe guides for the distribution of television signals to a television radio broadcasting network. In such a system there may be need for apparatus capable of translating a single band of television signals in one or more steps from an initial frequency position at the bottom of the frequency spectrum to a mean frequency of several thousand megacycles, and other apparatus capable of performing the reciprocal frequency translating operation. Again it may be desired in such a system to translate a block consisting of several or many television bands from one frequency position to another, or to translate a plurality of television signals widely separated in the frequency spectrum to another frequency position without employing a plurality of separate translating devices and beating frequencies for that purpose. These and other typical situations envisaged in practice give rise to individual problems many of which can be met only imperfectly in the present state of the art. In certain of its aspects the present invention relates also to frequency-selective, or filter elements and systems, including electromagnetic space resonance devices.

The frequency translating devices of the present invention comprise a distorting or modulating element having a non-linear voltage-current characteristic and one or more chambers and/or wave reactors associated therewith in various particular manners to be set forth in detail hereinafter. In leading up to the description of various specific embodiments of the invention, and to facilitate understanding of the essential natures thereof, certain principles will be developed which are applicable also to various early elementary forms of modulators disclosed for example in United States Patents to G. C. Southworth et al., No. 2,106,770, February 1, 1938; G. C. Southworth, No. 2,106,771, February 1, 1938; and G. C. Southworth et al., No. 2,142,159, January 3, 1939.

In the drawings:

Figs. 1 to 6 illustrate different means for coupling a hollow uniconductor wave guide and a conventional multiconductor transmission line, without provision for frequency translation;

Figs. 7 to 13 relate to modulators of elementary form;

Figs. 14 to 19 are explanatory of frequency changing means suitable for use in connection with the arrangements of Figs. 7 to 13;

Figs. 20 to 33 illustrate improved modulators of more complex form;

Figs. 34 to 36 illustrate modulators with special provision for suppression of carrier wave;

Figs. 37 and 38 illustrate another carrier-suppressing modulator, utilizing rotation of the plane of wave polarization;

Figs. 52 to 69 show still other details relating to use of the invention.

Inasmuch as it will be evident to those skilled in the art that the present invention is adaptable, with appropriate modification of structure, to electromagnetic waves of various field configurations or types and to chambers and guides of various shapes, it will suffice to describe the invention largely in terms of guides and chambers of rectangular cross section and waves of dominant type. In this type of wave the lines of electric force extend completely across the interior of the guiding structure and are everywhere approximately parallel to each other.

Figs. 1 to 6 illustrate various means by which dielectrically guided waves of dominant type in a hollow pipe guide of rectangular cross section can be effectively delivered to a two-wire transmission line or circuit. The same means may be employed for the reciprocal operation of converting wave power delivered by the line or circuit into dielectrically guided waves of the type specified. In practice the guide may be a few inches in length and a part of a resonant cavity or it may be part of a very long line. In each of these six figures the same frequencies prevail in both the pipe guide and the connected line; adaptation of the couplings to frequency translation is illustrated in later figures.

Figure 1:
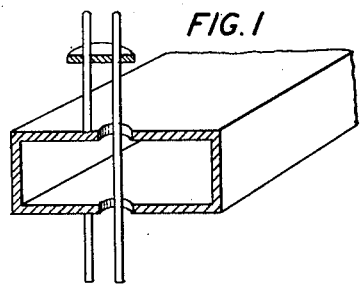
Figure 2:
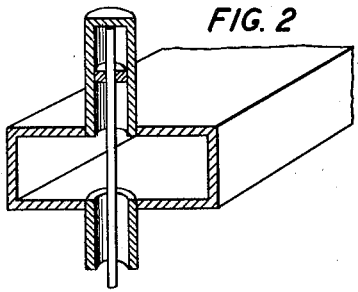

In Fig. 1 a two-wire line is brought up to one face of a pipe guide and one of the conductors passes through the interior thereof in alignment with the electric field of the guided waves to be excited in or received from the guide. The two-wire line is continued at the opposite face to form a Lecher system or tuner comprising a longitudinally adjustable reflector. The latter may be adjusted for maximum coupling between the guide and line. Fig. 2 shows essentially the same arrangement except for the substitution of a coaxial conductor line for the two-wire line.

Figure 3:
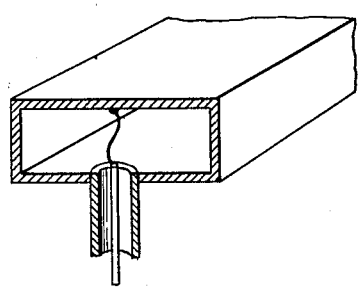
Figure 4:
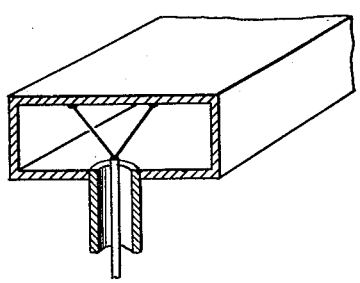

Figs. 3 and 4 show couplings in which connection is made from the inner conductor of a coaxial line that terminates at one face of the guide, to the opposite face of the guide through conductors such that the electrical length is approximately equal to a half wave-length at the operating frequency. In Fig. 3 the conductor is of sinuous form whereas in Fig. 4 there are a pair of conductors symmetrically connected from the inner conductor of the coaxial system to separated points in the same transverse plane.

Figure 5:
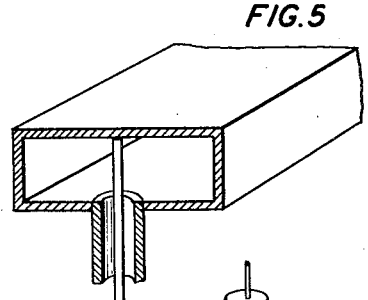

In Fig. 5 the inner conductor of a coaxial line enters at one face of the guide and terminates at the other. This is an imperfectly matched form of coupling. It may be employed fairly effectively in conjunction with compensating reactance in the wave guide.

Figure 6:
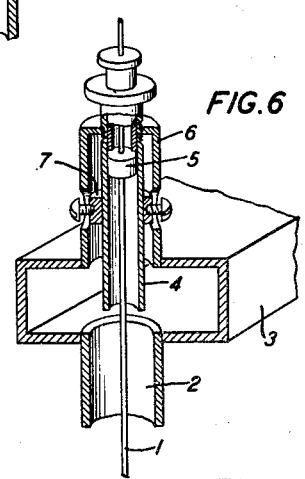

The coupling illustrated in Fig. 6 is adapted for various degrees of mismatching of impedances and for increase of the effective band width of the coupling. It is particularly useful where a relatively loose coupling between a coaxial conductor line and a wave guide is desired. An example would be in the introduction of a small amount of beating oscillator power into a wave guide for purposes of modulation. As shown in Fig. 6 the inner conductor 1 of the coaxial system 2 extends through the wave guide 3 and is terminated in a pair of concentric Lecher systems. One of the latter comprises a hollow conductor 4 which is concentric with the inner conductor 1 and arranged to be advanced or retracted with reference to the wave guide thereby exposing more or less of the inner conductor. The effective length of the coaxial tuner formed by the conductors 1 and 4 is adjusted by means of a metallic piston 5. The second Lecher system is formed by the hollow conductor 4 and the outer hollow conductor 6 which terminates at the upper face of the guide. The effective length of this second Lecher system is adjustable by means of the metallic annular piston 7. By properly adjusting the inner piston 5 various kinds of reactance may be presented to the coaxial line. In a somewhat similar way it is possible by adjusting the outer coaxial piston 7 to present to the wave guide almost any kind and amount of reactance. The Fig. 6 coupling is to be regarded as a modification of a coupling previously devised by A. C. Beck for which application for patent, Serial No. 429,358, was filed February 3, 1942 now Patent No. 2,408,032.

The modulation systems hereinafter described involve the effective application of two waves or currents of different frequencies to a distorting element and the derivation of a wave or current of a third frequency related to the other two. Thus, there may be a carrier or beating wave having a frequency of several thousand megacycles and a signal wave of relatively low frequency which are together impressed on the distorting or modulating element. The third wave is or may be one of the principal modulation products thereby generated by the modulating element, such as a wave corresponding in frequency to the sum or difference of the two. Since the signal wave ordinarily occupies a band of frequencies, the third wave likewise occupies a band of frequencies and it is commonly called a side-band or signal side-band. The frequency width of the side-band is usually small in comparison with its mean frequency and it will be convenient and proper in many cases to refer to the side-band frequency as if the side-band were a single frequency wave.

Again, the two waves applied to the modulating element may be a signal wave transmitted as a side-band of high frequency from a distant transmitting station and a carrier or beating wave having a frequency of the same order of magnitude. The derived third wave may in such case have a comparatively low frequency corresponding to the difference between carrier and side-band frequencies, and it may correspond identically with the original signal. The beating wave may be supplied locally or it may be supplied together with the side-band from the distant station.

Figure 7:
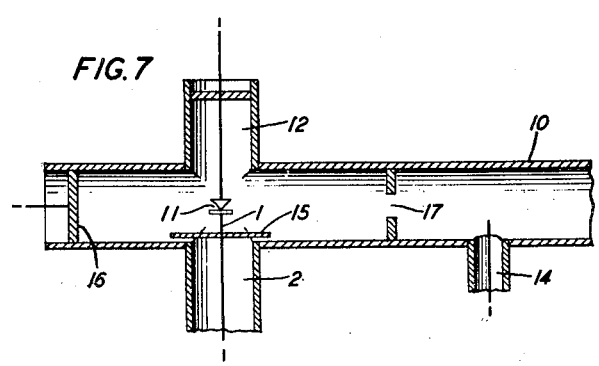

In Fig. 7 there is shown in longitudinal section a simple form of modulator at the end of a hollow pipe guide 10. The non-linear element 11 is disposed within the guide and interposed in the conductor 1 of a coaxial conductor system which, as in Fig. 2, comprises a coaxial line 2 and associated coaxial tuner 12. The element 11 may be a crystal of pure silicon or iron pyrites although it will be evident that it may take any of a variety of other suitable forms. Assuming for specific example that the modulator is to be used for receiving signals transmitted through the guide 10 from a distant station, the incoming waves are picked up by the conductor 1 and impressed on the crystal 11. It would be more accurate perhaps to say that the incoming waves induce a corresponding electromotive force in the conductor 1, and that this electromotive force causes current to flow through an electrical circuit comprising conductor 1, the crystal 11, the coaxial tuner 12 and the wall of the guide. Beating oscillations of a frequency comparable with that of the received waves are impressed on the crystal 11 in the same manner. The beating oscillations may be generated at the distant station and supplied concurrently with the signals over the guide 10, or they may be introduced into the guide 10 at a point near the modulator as by means of a coaxial system 14 the inner conductor of which extends some distance into the interior of the pipe guide to serve as an exciter.

As a result of the application of the two waves to the crystal 11 in Fig. 7 there are generated various modulation products including one having a relatively low frequency equal to the difference between the frequencies of the two applied waves. This difference frequency is carried off through the coaxial conductor line 2 to additional receiving apparatus not shown. A conductive cover plate or by-pass 15 spaced from the open end of the coaxial line 2 allows the difference frequency to escape into the line but substantially prevents escape of any high frequency wave power.

A longitudinally adjustable reflector, such as a metallic piston 16, may be advantageously placed in the end portion of guide 10 and adjusted in position for minimum reflection of waves back into the guide. Tuner 12 is simultaneously adjusted with the same objective, viz., impedance matching, in view. If the two high frequency waves are nearly enough alike in frequency a setting can sometimes be found such that substantially all of the available high frequency wave power is delivered to the crystal 11. In so far as the two frequencies differ the adjustments may be made optimum for one or the other but not for both. Even though the two frequencies be substantially alike, however, the effective resistance of the crystal 11 may be such that no combination of adjustments can be found that will completely suppress reflection. In such case a more nearly perfect impedance match may be had by adding a reactor, such as an iris diaphragm 17 of adjustable aperture and position which together with the piston 16 and the end portion of the guide 10 forms a resonance chamber enclosing the crystal 11. The several variables may then be adjusted to effect a substantially perfect impedance match between the modulator and the connected wave guide. It will be appreciated that such adjustment is optimum for both of the high frequencies involved only in so far as these frequencies are substantially equal to each other. In general the resonance chamber tends to make the modulator more sharply selective with respect to the applied frequencies.

The Fig. 7 modulator requires no alteration for use at the transmitting end of the system, and the only external change is the substitution of a signal source for the signal receiver assumed to be connected to the coaxial line 2. If desired, the beating or carrier oscillator line 14 may be coupled alternatively to a point within the resonance chamber.

Figure 8:
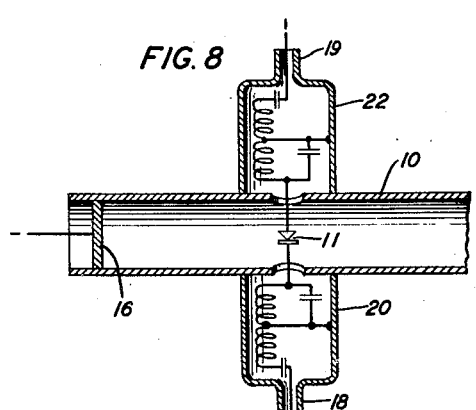

Whereas in Fig. 7 the beating oscillations are supplied through the guide 10 that carries the side-band, Fig. 8 illustrates a modulator in which these oscillations are supplied over a coaxial line in circuit relation with the crystal. In this case the conductor in which crystal 11 is interposed extends in one direction through the guide wall to an impedance matching network connected with a coaxial line 18, and it extends similarly in the opposite direction to make circuit connection with a second coaxial line 19 through another impedance matching network. The two networks are enclosed by shields 20 and 22 which are virtually enlarged continuations of the respective outer conductors of lines 18 and 19. Line 19 leads to a beating oscillator which in a typical case may have a frequency of 2000 megacycles. Line 18 leads to a signal receiving circuit or signal source having a frequency of 1500 megacycles, for example. The frequency of the waves transmitted through the guide 10 in such case is or may be 3500 megacycles. Wave guide piston 16 is adjusted for maximum output into the wave guide 10 or for maximum power into the line 18 as the case may be.

Figure 9:
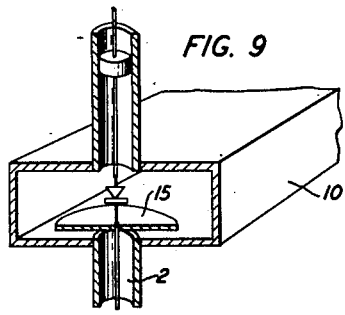
Figure 10:
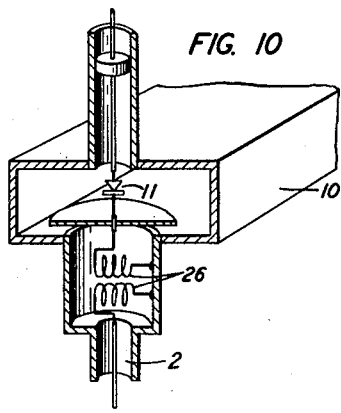

Figs. 9 to 13 illustrate three different variations of details of the Fig. 7 modulator relating to the manner in which the coaxial line 2 is connected. Fig. 9 shows in detail the relation of the by-pass or cover plate to the coaxial line 2. This arrangement is adapted primarily for signals of low audible frequency. In Fig. 10 an impedance matching transformer 26 is interposed between the wave guide 10 and the coaxial line 2 with an enlargement of the outer conductor of the latter serving as a shielding chamber. By using the transformer 26 or some other form of network a good impedance match between the crystal 11 and the line 2 may be had at voice frequencies. By an appropriate change in the design of the transformer a moderately good match can be effected for frequencies extending from the voice range well into the radio range.

Figure 11:
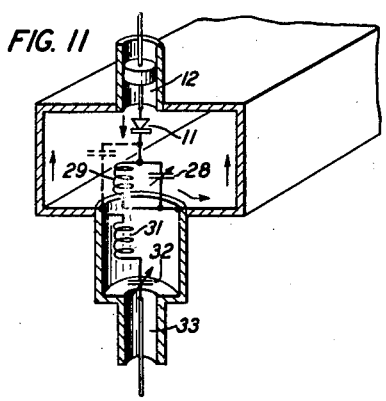
Figure 12:
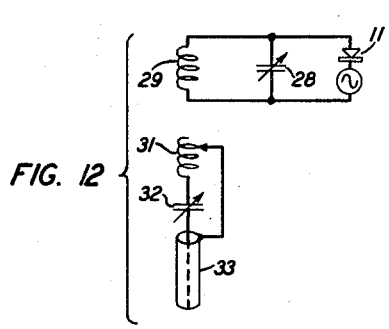
Figure 13:
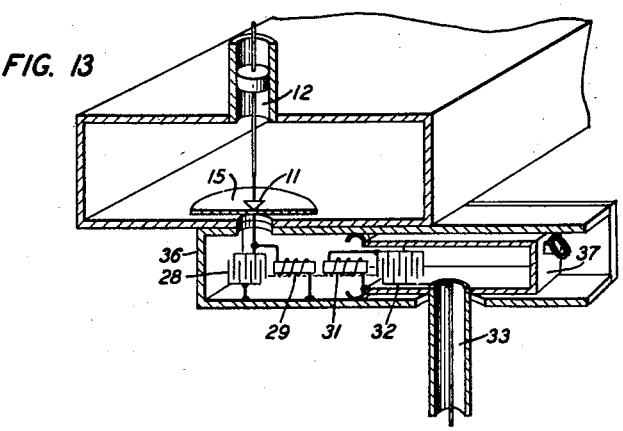

The more elaborate form shown in Figs. 11 to 13 is especially adapted to handle signals having a frequency of perhaps 30 megacycles, such as would be present if the frequency of the received sideband were 3030 megacycles and the beating frequency 3000 megacycles. A unit of this kind is of particular use when television signals are to be transmitted or received. Fig. 12 shows a simplified circuit diagram corresponding to the apparatus of Fig. 11. The operation of the apparatus may be explained as follows: Waves of frequencies 3000 megacycles and 3030 megacycles are assumed to be passing through the rectangular wave guide. These are impressed on the crystal 11 by the combined effect of the coaxial tuner 12 and any chamber that may be associated with the wave guide. Associated with these waves are currents that flow in the general directions indicated by the arrows. The variable condenser 28 acts as a by-pass condenser and the coil 29 acts as a choke for the high frequencies prevailing in the guide.

These high frequency currents acting on the crystal 11, set up in its lead not only a rectified component but also a difference component of 30 megacycles as well as many other demodulation products. The condenser 28 and the coil 29 are of such proportions as to be approximately in resonance with 30 megacycles. A secondary circuit made up of coil 31 and condenser 32 is coupled to the primary in such a way as to transfer 30 megacycles power from the wave guide circuit to the coaxial line 33. These low frequency circuits tend to limit any other modulation products that may be present.

In setting up this apparatus relative position is highly important. Fig. 13 shows one way in which the apparatus may be mounted so that appropriate requirements may be met. Again the same corresponding reference numbers are used. In this figure a by-pass condenser 15 prevents any considerable amount of the carrier frequency of the incoming guided waves from passing from the crystal 11 into the elements associated with the 30 megacycle coaxial system. The latter as shown in Fig. 13 is contained in a metal compartment 36 immediately below the wave guide. The condenser 28 and coil 29 are mounted in a fixed position in the compartment. These together with the associated wave guide wall constitute the primary circuit shown in Fig. 12 with the crystal 11 serving as a source of driving electromotive force. The secondary circuit consists of the coil 31 and condenser 32 together with the load, which in this case is the coaxial 33 and whatever may be attached thereto. It is desirable that there should be some latitude of coupling adjustment between the primary and secondary circuits and to make this possible the entire secondary circuit is mounted on a sliding metal tray 37.

For a better understanding of certain modulators next to be described I will briefly explain with reference to Figs. 14 to 19 certain relevant experiments that have been performed. Referring to Fig. 14 a wave guide section 41 was set up to receive radiation from a source 42 to 3000 megacycles. A silicon detector 44 was set up in the guide section and was so adjusted as to terminate the guide in its characteristic impedance. It therefore was capable of indicating absorbed power. In carrying out the experiment the combination consisting of the detector unit 44 and the reflecting piston 45 was so adjusted that no appreciable standing wave could be found. Leaving the apparatus in this tuned condition a second non-linear element 47 was added and so tuned by the coaxial tuner 48 that only a limited amount of power reached the termination. Observations made on the traveling detector 46 indicated that under this circumstance the newly added modulator unit 47 reflected much of the incident wave power. It was found that by this means the amount of power passing 47 and reaching the terminating absorber 44 could be varied over a range of about 4 to 1 merely by varying a direct current biasing voltage applied to the element 47. This is shown more explicitly in Fig. 15 in which the biasing voltage from 49 is impressed on the element 47 through the coaxial tuner 48. The outer conductor of the latter is insulated from the guide 41 but capacitatively connected thereto for high frequencies. A more precise description of the experiment is obtained by reference to Figs. 16 to 19. The first is the volt-ampere characteristic of the detector 47. It shows the well-known non-linearity between current and voltage. Fig. 17 shows how the direct current resistance varied with applied voltage while Fig. 18 shows how the measured wave power reaching the termination varied with the direct current voltage applied to the detector 47. It indicates that one may control, within certain limits, the power flow through a guide merely by varying the voltage applied to the modulating crystal. This will, of course, hold even though the bias is variable at high frequency. More specifically, speech frequencies or radio frequencies, together with the necessary direct current bias, may be applied to the crystal so as to vary the voltage between the limits specified and thereby modulate the output power traveling into the wave guide past the modulator.

In its performance the modulating crystal acts as a resistance shunted across the wave guide. When the resistance is low relatively little power passes that point into the guide. When the resistance is high a much larger amount of power is transmitted. From this it is seen that the modulating voltage varies the effective value of the shunting resistance and thus modulates the carrier wave.

In support of this view the direct current resistance calculated from various values of direct current and voltage was plotted against the square root of the total power absorbed in the termination. The results are shown in Fig. 19. It will be observed that the relation is substantially linear for the lower portions of its length showing that within limits this circuit obeys Ohm's law. This discovery that the tuned non-linear modulator should be regarded as a shunt impedance of which the resistance component varies with applied voltage constitutes an important part of my invention and will be made use of in circuits to be described hereinafter.

It should be understood that the crystal detector here shown is merely typical of other non-linear devices that may be used as modulators. Indeed it may be sufficient if the device possesses a non-linear reactance. As a result of this situation it is possible to replace the crystal detector with a mass of rarefied gas either in the form of a volume as disclosed in United States Patent No. 2,106,770 or a transverse tube as disclosed in United States Patent No. 2,253,503, or with a disc of non-linear material associated with suitable electrodes as disclosed in United States Patent No. 2,129,712. It is also possible to use a small condenser made up of a permanently polarized dielectric. The latter may be constructed by allowing certain wax-like materials, such as beeswax, to solidify under a strong unidirectional electrostatic field.

The modulator illustrated in Fig. 20 will be recognized as having certain features in common with the modulator described with reference to Figs. 14 to 19. The beating oscillator source 23 is disposed in a hollow pipe guide 13 that is connected as an extension of the main guide 10 whereby beating oscillations are passed in the form of guided waves to the crystal 21. The latter is associated with the coaxial line 2 and with the coaxial tuner 12 in the manner described with reference to Fig. 7. The side-bands resulting from the intermodulation of signals and beating oscillations proceed to the right through the main guide 10. Similarly, signal-bearing waves received from the guide 10 are impressed on the crystal 21 together with beating oscillations from the source 23 and the resulting low frequency modulation component corresponding to the signal is delivered over the coaxial line 2 to the receiving equipment connected thereto. It will be noted that in the Fig. 20 modulator as thus far described the three paths for the three principal frequencies, that is, signal, side-band and beating oscillations, are separate and distinct and converge at the distorting element.

Figure 20:
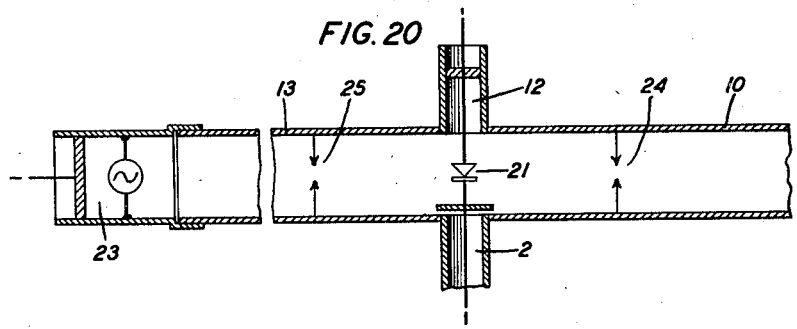

An important feature of the Fig. 20 modulator lies in the provision made for efficient coupling of the crystal 21 to the beating oscillator guide 13 and to the main guide 10. It has been explained hereinbefore that a piston placed a certain distance to one side of an element such as crystal 21 tends to enhance the absorption of wave power supplied from the other side, the spacing depending on the operating frequency involved; but it is evident that a piston placed to one side of the element 21 in Fig. 20 would decouple one of the essential paths. Somewhat the same effect, however, is achieved in Fig. 20 by introducing a reactor in lieu of a piston. A reactor, it will be understood, gives rise to partial reflection of the incident waves inasmuch as it represents an impedance discontinuity. Thus a reactor 24, such as an iris diaphragm, is interposed in the guide 10 to the right of crystal 21 and it is positioned to favor, much as a piston would, the absorption in crystal 21 of wave power supplied from the beating oscillator 23. Another reactor 25 is similarly disposed to the left of the crystal in guide 25 and it is assigned such value and position as to enhance the coupling between the crystal and the guide 10 to the right. Since the reactors are permeable to guided waves regardless of the direction of transmission thereof, the reactor 24, for example, which is associated in a sense with oscillator 23 allows the passage of side-band power to or from the guide 10. The coaxial tuner 12 may be adjusted for maximum absorption in device 21 of either the beating oscillations or received side-bands, assuming that they are substantially different in frequency, or it may be adjusted to a compromise value.

Generally it will be found desirable to coordinate the final adjustment of the several variables, i. e., position and magnitude of the two reactances and the adjustment of the coaxial tuner, for each adjustment has some effect on the others. In many cases too where the supply of beating power is ample the adjustments may be made with a view to maximizing the coupling between crystal 21 and guide 10 thereby conserving or utilizing most effectively the transmitted or received side-band power. In such cases the coupling of the crystal to the beating oscillator may be made fairly loose, as by reducing the opening of iris 25, and it will be found advantageous to adjust the electrical length of the guide section between the beating oscillator 23 and iris 25. This length adjustment may be secured as shown by use of a bayonet joint in the guide 13.

The Fig. 20 modulator will accommodate a greater percentage difference in the beating and side-band frequencies than the simple arrangement illustrated, for example, in Fig. 7, or the same percentage difference with greater efficiency. There is a corresponding improvement with respect to width of side-band that can be effectively handled by the modulator.

It will be noted in connection with Fig. 20 that the two reactors 24 and 25 and the intervening portion of guide form a resonance chamber enclosing the crystal 21. The tendency of this chamber to impede through transmission, i. e., direct transmission between the two guides 10 and 13, is of considerable advantage, since it is highly desirable that the side-bands, whether received over the guide 10 or generated by the distorting device 21, shall not be dissipated in the guide 13 and the beating oscillator. Likewise, escape of beating oscillator power into the guide 10 should be avoided as much as possible. It is to be noted too that a third reactance is or can be introduced, by coaxial tuner 12, which is effective in giving the chamber a kind of double-peaked resonance characteristic.

Figure 21:
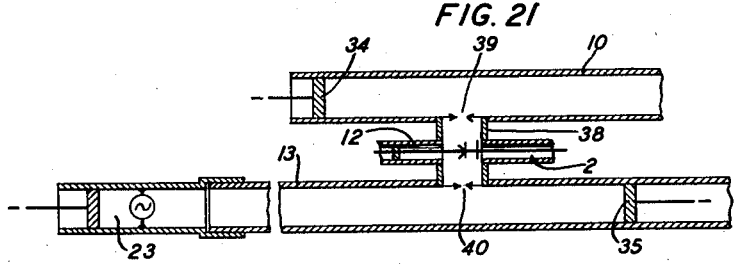

Fig. 21 illustrates a modulator that has some of the features of Fig. 20. In this case the main guide 10 and the beating oscillator guide 13 are terminated in respective adjustable pistons 34 and 35 and a cross chamber 38 interconnects points in the guides 10 and 13 that are adjacent the pistons. The crystal 21 is disposed in the cross chamber and a coaxial system like that shown at 2—12 in Fig. 20 is connected thereto. Where the cross chamber joins the two guides, iris reactors 39 and 40 are provided. Beating oscillations supplied through guide 13 pass through the iris 40 into cross chamber 38 where they are applied to the crystal, and the side-bands generated therein by intermodulation with signal currents traversing the crystal proceed through iris 39 into the guide 10. The pistons 34 and 35 are adjusted to facilitate transfer of the wave power between the two wave guides and the cross chamber, for beating and side-band frequencies, respectively. In a sense the two pistons constitute means for tuning out the reactance that is incidental to change in direction of the wave path at the extremities of the cross chamber.

The length of the cross chamber 38, the tuning of the coaxial tuner 2, the adjustment of the irises 39 and 40, and the position of the crystal relative to the irises, are all fixed in the manner and for the purpose described relative to the iris-bounded chamber in Fig. 20. Additional discrimination against the transmission of waves directly from one guide to the other is afforded by the pistons 34 and 35 for these are frequency discriminatory in their action and each favors transmission of only a respective one of the two wave guide frequencies. Each may have an associated iris, as in Fig. 25, to provide additional selectivity and impedance matching.

The orientation of the pickup conductor within the cross chamber 38 of Fig. 21 may be changed 90 degrees, if desired, but it should in any event be consistent with the orientation of the beating oscillator 23 and with that of the waves in guide 10 where waves are to be received therefrom.

Figure 22:
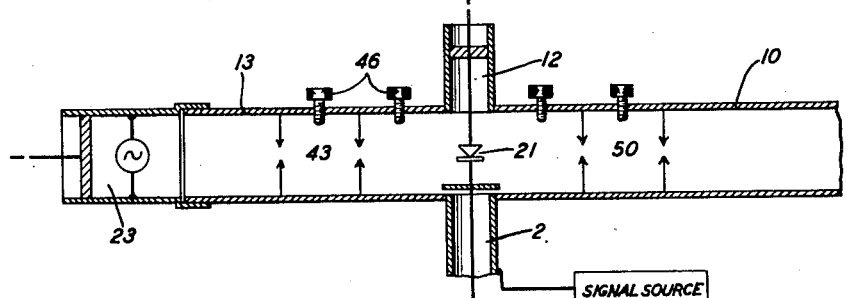

Fig. 22 illustrates a modulation system in accordance with the invention in which, as in Fig. 20, for example, the input or output guide 10, the beating oscillator guide 13, and the coaxial line connected to the low frequency circuit 2 constitute three fairly separate and distinct paths all converging at the modulating element. Crystal 21, associated with a coaxial tuner 12 as in preceding examples, is disposed in a chamber bounded by filters 43 and 50. Filter 43 is interposed in guide 13 and is designed to pass waves of beating oscillator frequency, and filter 50 is similarly interposed in guide 10 and passes waves of side-band frequency. Each of these filters may be designed to reject or suppress waves of any significant frequency lying outside its respective pass-band, and in any case each is designed to reject the frequency passed by the other. Thus, each may present to the waves passed by the other a reactive impedance such as to constitute a marked impedance discontinuity. In such case each of the filters 43 and 50 constitutes a reflector or virtual piston for the waves it rejects, and the effective position of the virtual piston can be adjusted by shifting the position of the filter. Hence, beating oscillations passing from source 23 through filter 43 meet in filter 50 a virtual piston having an effective position somewhat beyond the crystal 21, and likewise filter 43 operates as a complete reflector for side-band waves received through filter 50 or generated by the distorting device 21. In accordance with principles explained with reference to Fig. 7 the spacing of each of the virtual pistons is adjusted to effect impedance matching, between guide and crystal, for one or the other of the two guided waves. It will be seen, therefore, that the two filters prevent the admission of unwanted frequencies to the chamber formed between them, they admit the respective wanted frequencies, and they serve as virtual pistons for matching their respective complementary frequencies to the distorting device. It follows too that escape of beating oscillator power to the guide 10 is blocked as is also escape of side-band power into guide 13. Furthermore, filter 50 may be designed to pass only one generated side-band and to reactively reject the other so that the power content of the latter is conserved and translated into wanted side-band power.

Each of the filters 43 and 50 may comprise, as shown, a pair of irises spaced apart to form a resonance chamber having a band-pass characteristic. The configuration and size of the iris apertures and the spacing between them are independent variables which permit considerable latitude in designing and adjusting the filters to meet the requirements of any specific case in practice.

To facilitate adjustment of the two filters and of the effective electrical separation of the filters from the crystal 21, trimming screws 46 may be provided as shown. The effect of the trimming screws depends simply on the extent to which they penetrate into the interior of the guide. In general, increasing the length of the screw portion within the guide, along the lines of electric force, tends to increase the electrical length of the guide.

Coaxial tuner 12 may be adjusted to an optimum setting for either the beating oscillations or the generated side-bands, or it may be adjusted to an intermediate or compromise value.

Figure 22A:
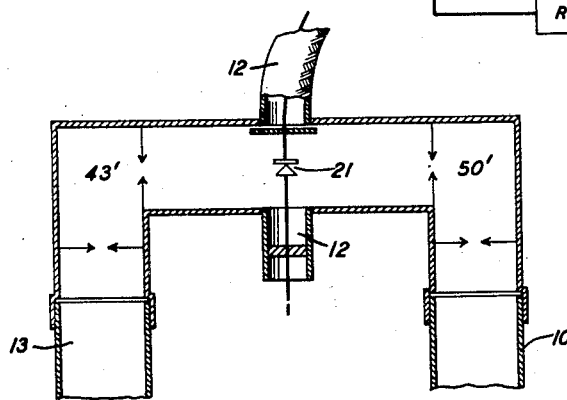

Fig. 22A illustrates a modification of the Fig. 22 system having as one virtue the fact that it comprises an integral modulation unit which may be readily plugged in or out of engagement with the side-band and beating oscillator guides 10 and 13 respectively, thereby facilitating the substitution of one unit for another, as in case need for repair or readjustment occurs. In this embodiment a right angle change in direction is made at the ends of the iris-bounded modulation chamber whereby each of these irises lies in the side wall and near the closed end of one of the filter-reflector chambers 43' and 50'. The latter respectively corresponds with the chambers 43 and 50 of Fig. 22. To the iris-bounded end of each chamber is connected a short section of pipe guide which comprises a part of the plug-in means for the modulation unit. These two parallel guide sections are adapted for engagement, through a bayonet point or the like, with the guides 10 and 13, respectively, which are assumed to be fixed in position.

The modulation system shown in Fig. 23 comprises a pair of intersecting wave guide chambers with the modulating element common to both. One of the chambers is formed by the end portion of the input-output guide 10, piston 34 and iris 51. The other is similarly formed at the end of the beating oscillator guide 13 between piston 35 and iris 52. At the junction of the two chambers is the crystal 21, its coaxial tuner 12 and coaxial line 2, as shown in further detail in Fig. 24. The chamber associated with guide 10 is tuned aproximately to the side-band frequency, and the other chamber is tuned approximately to the beating frequency. The two chambers are so closely coupled to each other, however, by virtue of their intersection, that the adjustment of either affects the tuning of the other. These adjustments are therefore to be coordinated with each other and with the adjustment of coaxial tuner 12 to the end that the total reactance is minimum.

Fig. 25 illustrates a modulation system which like the one last described comprises a pair of coupled chambers respective to the side-band and beating waves. In this embodiment the two chambers do not intersect but are closely coupled to each other by a kind of cross chamber. The latter comprises a coaxial conductor system one portion of which lies between the two wave guide chambers and houses the crystal 21. The latter is shunted across the coaxial system and it is associated with a by-pass plate and coaxial line 2 in the manner of Fig. 7. The two outer portions of the coaxial system are terminated by adjustable reflectors 53, 54, which contribute to securing an impedance match between the respective guides and the crystal. The manner of adjustment is much the same as that for Fig. 23.

Fig. 26 illustrates an embodiment in which the upper and lower side-bands that are generated are segregated from each other for transmission each in its own individual guide. In this figure there is shown the carrier frequency source 23 and the coaxial line 2 bringing in the message frequency. By reducing the cross section of the wave guide 58 (here shown much exaggerated) one excludes from this branch the carrier and the lower side-band, transmitting only the upper side-band. In the branch 59, on the other band, by means of the series of irises constituting a narrow band-pass filter, the lower side-band only is transmitted.

Assuming the crystal is in each case asymmetrically conductive, the detector arrangements shown above lead to half-wave rectification. An improvement in operation may be obtained by use of full-wave rectification and one means for bringing this about in wave guides is shown in Fig. 27. In this figure the wave guide, here shown as rectangular in cross section, is divided into two sections by a conducting plate 61 placed transversely to the direction of the electric vector of the guided waves and insulated from the guide walls. The length of the wave guide over which this partition extends is not highly critical and may be goverened mainly by mechanical considerations. From the purely electrical point of view the partition may be simply a transverse wire. Two crystals or other non-linear elements 62 and 63 are placed one in each section and oppositely poled, being bridged from the partition 61 across the section to coaxial tuners 65, 66. Association with a low frequency circuit, or signal circuit, is indicated by conductor 67 passing through a small aperture in the wave guide. Leakage of high frequency power over this conductor 67 is prevented by the by-pass condenser 68 in the manner already frequently described. A simplified schematic circuit diagram of Fig. 27 is shown in Fig. 28.

It may be assumed that primary frequencies in the region of 3000 megacycles are applied to the crystals by the received guided waves. These result in high frequency currents through the two crystals, the coaxial tuners, the walls of the guide and the median conductor 61. The latter is transverse to the lines of electric force of a primary wave and consequently does not markedly affect the wave configuration but does divide the wave into two portions, each of substantially half the voltage of the undivided wave. A high frequency path is completed through the blocking condenser 68 and the tuning condenser 69, which are in parallel.

The low frequency circuit (30 megacycles, e. g.) consists of the crystals 62 and 63 and the tuned circuit made up of the condenser 69 and coil 70. The coaxial line with its load is coupled to the circuit by means of the coil 71 and the condenser 72.

Figure 29:
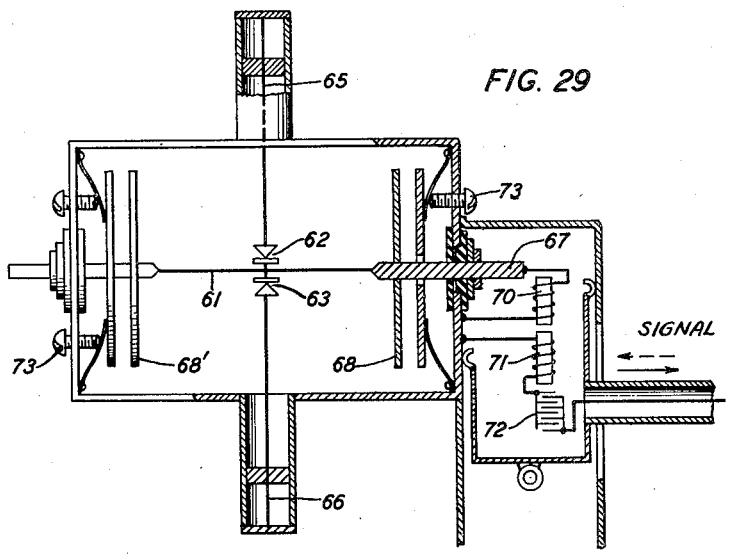

Fig. 29 shows in more specific detail a mechanical structure for carrying out this form of my invention. Here 61 again represents the insulated conducting partition. The primary tuning condenser and the blocking condenser are combined in 68 and 68'. This condenser is made variable by changing the plate spacing by means of screws 73, thus providing tuning flexibility.

Figure 30:
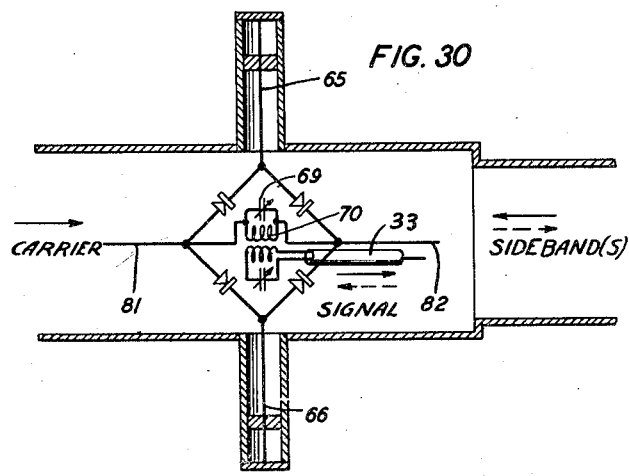
Figure 31:
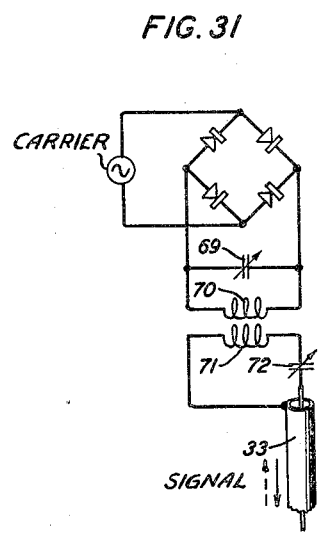

The detector arrangement just described gives rise to full-wave rectification but it will be observed that this is done by dividing the variable voltages of the incoming wave. A modification which gives both full voltage and full wave rectification is shown in Fig. 30, this being a schematic representation showing a longitudinal section of a wave guide. Fig. 31 is a simplified equivalent circuit. Figs. 32 and 33 show different cross-sectional views of the mechanical arrangements in a device for carrying out the objects of the circuit of Fig. 30. In each of these figures there are shown two conducting partitions 81 and 82 placed transversely to the direction of the electric vector and supported within the guide by suitably insulated plugs 83. These partitions serve the purpose of dividing the voltage of the incoming wave in the manner described in connection with Fig. 27 and of supporting the crystals and condenser. Full-wave rectification with full applied voltage is therefore obtained by a four-arm bridge, each arm containing a non-linear element, all in a maner which is well understood in other branches of the communication field. The primary circuit of the low frequency path is shown as the condenser 69 and coil 70, the condenser 69 being conveniently disposed between the two partition plates 81 and 82. The coil 70 may be disposed as shown in Fig. 32 outside the wave guide and in a chamber 36, this coil being coupled to the circuit 31, 32 and to the coaxial 33 in the manner described in connection with Fig. 13. In this case, as well as in that of Fig. 13, the chamber 36 serves as a useful and effective shield for the coupling circuits.

In the circuit arrangements of Figs. 27 to 33 the incoming wave on the guide may include a carrier frequency as well as the one or two side-bands. If only a side-band has been transmitted, then it is to be understood that a local supply of carrier frequency must also be available in a manner indicated in connection with other figures, such as Figs. 7, 20 and 22. It is also to be emphasized that while the circuits of Figs. 27 to 33 have been described in terms of received side-band, they will function in the reverse direction when a carrier is supplied to the wave guide and a signal with which it is to be modulated is supplied over the coaxial cable. Thus, in the arrangement illustrated in Figs. 27 to 29, and also in that illustrated in Figs. 30 to 33, guided carrier waves may be brought up from the left and impressed on the crystals concurrently with either signal currents from the low frequency circuit or signal-modulated guided waves received from the right, depending on whether the purpose is to launch signal-modulated waves in the guide or to recover the signals borne by guided waves arriving from the right.

It is possible to eliminate the carrier frequency in a wave guide modulation system by the expedient shown in Fig. 34. A median plane conductor 84 placed in the wave guide divides the carrier wave advancing from the left and impresses it on two identical non-linear elements 86 and 87. After passing these elements the wave in the lower section of the guide is given a phase delay of one-half period or any odd number of half periods, with the result that the two components are reunited in opposite phase. This balanced condition remains so long as the two crystals are identical. If, however, a bias is placed on the median plane, the crystal balance is destroyed and waves pass into the guide to the right over the one or the other of the paths. If this bias is now replaced by a modulating voltage, the unbalance will be modified in accordance with the undulations of the modulation, thereby giving side-band power with carrier eliminated. Circuits for applying this modulating voltage may be essentially as shown in Figs. 27 and 29 above.

A modification of the arrangement of Fig. 34 is shown in Fig. 35. Here the dividing partition or septum is made up of two halves 84 and 85 with the crystals connected respectively one to each half and associated with an individual coaxial tuner. The biasing and/or modulating voltage is connected from 84 to 85 through side openings as in Fig. 29.

Fig. 36 is a still further modification showing a four-arm bridge of non-linear elements and adapted for full wave, full voltage modulation with carrier elimination. The corresponding circuit arrangements are exemplified by Figs. 30 to 33, inclusive.

Figure 38:
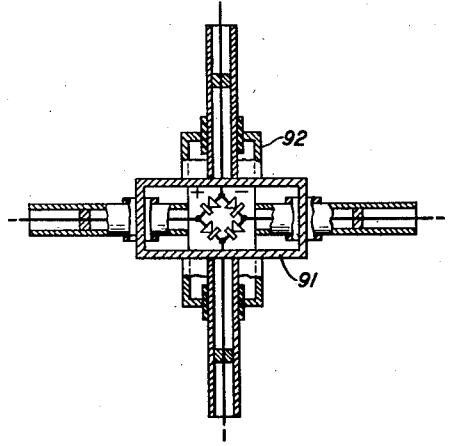
Figure 39:
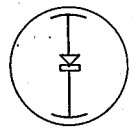
Figs. 39 to 51 illustrate various arrangements of the distorting element or elements relative to the guide or chamber.
Figure 40:
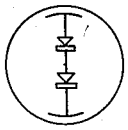
Figure 41:
Figure 42:
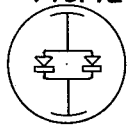
Figure 43:
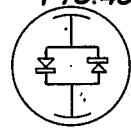
Figure 44:
Figure 45:
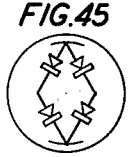
Figure 46:
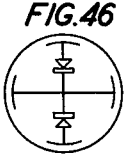
Figure 47:
Figure 48:
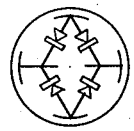
Figure 49:
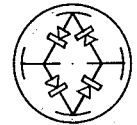

While the figures just discussed illustrate methods of obtaining modulation with elimination of carrier, I have found still other methods which are particularly suitable in certain cases. Such a method is illustrated in Figs. 37 and 38 in which two rectangular wave guides 91 and 92 are joined end on but rotated 90 degrees with respect to each other. One guide, such as 91, brings up the unmodulated carrier vertically polarized. The other will propagate wave power away from the device provided it is horizontally polarized. Non-linear modulating devices are located at the junction of the two guides as shown in both Figs. 37 and 38. Their purpose is to produce a rotation of the plane of polarization at the junction. Both guides are provided with median plane conductors for a short distance along their length in a manner analogous to that shown in Fig. 32. For simplicity, however, these planes have been omitted in the showing of Figs. 37 and 38.

Let it be assumed that an unmodulated wave is being propagated in the horizontal section 91. The lines of electric force, originally in the vertical direction, upon arriving at the bridge of non-linear elements meet a situation that is symmetrical so far as output is concerned with the result that no power is communicated to the output. If however, a modulating voltage is applied to the bridge momentarily, as indicated by the positive and negative signs of Fig. 38, the bridge becomes unbalanced, thereby giving a net horizontal voltage component across the vertical guide 92. The amount of power in this component communicated to the second guide is determined by the varying modulation voltage applied through the median plane to the bridge. It will be observed that this is a kind of carrier-eliminated system that makes use of the difference in polarization of the modulated and unmodulated components. It will be observed, too, that in this balanced modulation system, as in those described with reference to Figs. 34 to 36, the carrier wave is brought up to the modulation elements through an individual hollow pipe guide, and that the signal side-band wave is brought up or transmitted away through another hollow pipe guide, or section of guide, from which the carrier wave is substantially excluded. In each of these cases, too, the signal transceiver, i. e., the source or receiver of the signal or modulating wave, is connected to the non-linear elements by means of a separate transmission path comprising an ordinary two-conductor system, or circuit.

The subject-matter of Figs. 37 and 38 is disclosed and claimed in my copending application Serial No. 540,670, filed June 16, 1944.

The high utility of non-linear devices in wave guide practice is evident from the foregoing description of various circuit arrangements. While non-linear elements have been shown in different arrangements, it may be pointed out that there are additional arrangements in which the non-linear devices may be used in wave guides. Some of these are shown in Figs. 39 to 51. The associated matching circuits have been omitted for the purpose of simplicity. Some of these have already been described. Possible advantages of the various configurations may be given as follows:

(a) (Fig. 39) A simple elementary form which may or may not match adequately the wave guide or a low frequency circuit into which it operates. One-half wave of the cycle is utilized.

(b) (Fig. 40) Two or more units may be placed in series when either the output or the input circuit is of high impedance.

(c) (Fig. 41) Several conductors may contribute to the high frequency input of a single rectifier.

(d) (Figs. 42 and 44) Two or more units may be placed in parallel when either the output or input impedance is low.

(e) (Fig. 43) Two units in parallel but oppositely poled, useful when harmonic power in the form of higher order waves is to be generated.

(f) (Fig. 45) A series parallel arrangement for use when higher wave powers are to be used without overloading.

(g) (Fig. 46) Full wave rectification as in Fig. 27.

(h) (Fig. 47) Full wave rectification with full voltage as in Fig. 30.

(i) (Fig. 48) A system that remains balanced as voltage is applied to adjacent arms of the bridge.

(j) (Fig. 49) Similar to arrangement shown in Fig. 36.

(k) (Fig. 50) Two or more detectors placed along the guide at half wave intervals through outputs being placed in series.

Figure 50:
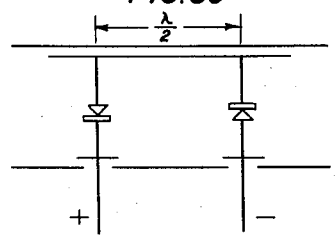
Figure 51:
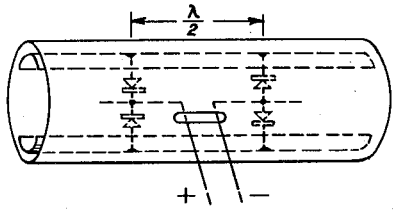

(l) (Fig. 51) Analogous to Fig. 50 but full wave rectification with half wave spacing.

Figure 52:
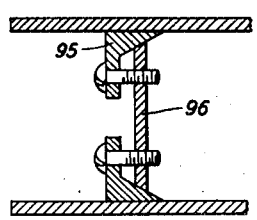
Figure 53:
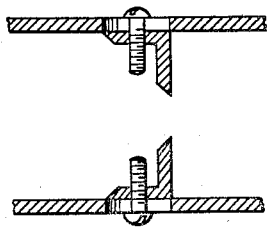

It is to be understood that the description of the Figs. 39 to 51 is exceedingly brief and that in actual practice other component parts will be needed to assemble them into a wave guide communication system. In particular there will be need for resonant chambers in which the barriers or pistons may first be adjusted and later securely fastened in position, possibly by expanding mechanically or by soldering. In some cases chambers of this kind will be placed in series for providing filter action. Figs. 52 and 53 show two forms that may be applied to either pistons or irises. The structure is made of two parts. The part 95, which may be either rectangular or circular depending on the shape of the guide, forms an approximate fit to the surrounding wall. The second part 96 fits inside the first in the manner shown in Fig. 52. Machine screws engage the two parts so as to draw one into the other, thereby expanding the piston walls firmly against the cylinder walls. When the piston or iris is in position the screws are tightened, bringing the two walls into intimate contact. Fig. 53 shows an iris structure in which screws threaded into the iris members extend through slots in the pipe wall as shown.

Since a wave guide is inherently a high-pass filter it will be advantageous to make use of this property in wave guide systems of the kind here contemplated. This affords an extremely simple and convenient method of excluding from the chamber all frequencies below a certain cut-off limit. There may, however, also be occasion for excluding from a chamber all frequencies above a certain limit or it may be desired to exclude all but a narrow band of frequencies. Means for accomplishing this result are described in my Patent 2,106,768, February 1, 1938. In particular, reference may be made to Fig. 10 of that patent. A convenient form of such a filter particularly adapted for passing a narrow band of frequencies can be obtained by making the small diameter portions there shown extremely short. This is substantially equivalent to a series of chambers connected by irises and it is this type of filter which is assumed in the branch 59 of Fig. 26. It is obvious of course that we may use a filter of this kind in lieu of the simple high-pass type mentioned above.

It will at times be desirable to branch off from the main guide a portion of the total signal to be transmitted or to be received. Such branching requires certain considerations, chief of which are proper impedance matching at the branching point to minimize reflection losses and proper addition or division of power at such point. Such addition or division may be on the basis of different frequencies without primary regard to power, or at one frequency in which primary consideration is on the basis of power.

Figure 54:
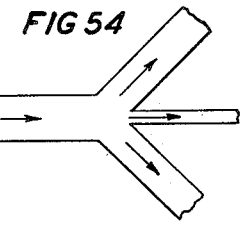
Figure 55:
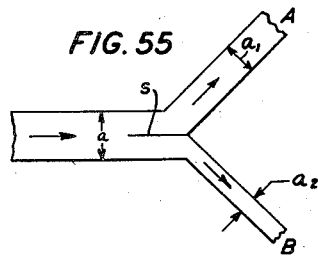

Fig. 54 represents, schematically, a branching of a single guide into three paths on the assumption of impedance matching. Such impedance matching can be obtained if the guide and guide branches are of any form of cross section, but one form which lends itself particularly to wave guide work is that in which the guide is rectangular in cross section. In a rectangular wave guide of dimensions $a$ and $b$ with the electric vector parallel to the $a$ dimension and the magnetic vector parallel to the $b$ dimension, the characteristic impedance of the guide section is directly proportional to $a$, which simple relationship lends itself readily to the problem in hand. This is illustrated in Fig. 55, which shows a wave guide section branching into two portions with the electric vector along the $a$ dimension. It can be shown that if the dimension $b$ along the magnetic vector is kept the same in all the branches, that impedance matching is then obtained if the sum of the dimensions $a_1$ and $a_2$ is equal to $a$. This becomes a little more evident if one has present or considers as present at the fork, a dividing septum or partition $s$. For a wave traveling from left to right it is seen that this septum will divide the wave with no disturbance, the component parts $e_1$ and $e_2$ of the original electric vector $e$ being transferred with no substantial loss into their respective branches. This subject-matter is claimed in my copending application, Serial No. 346,175, filed July 18, 1940.

From the above it is seen that it is possible to divide the main guide in such manner that each branch will contain the same proportions, by power, of the various frequency components prevailing in the main wave guide. In the particular case of branching shown in Fig. 55, the total power in the main guide is so divided that two-thirds flows into the power branch A and one-third into the branch B.

Figure 56:
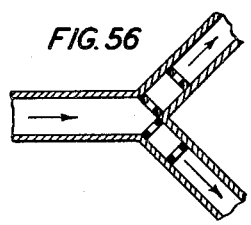

Fig. 56 shows a second form of branching which incorporates filters in the respective branches at the junction in such a way as to divide the wave power on the basis of frequency. The various frequency components may have the same or different power levels. The direction of power flow relative to the main guide may, of course, be either to or from the branches. It is convenient to think of the filter as a device for making its particular branch appear open for the preferred frequency and closed for all other frequencies. A particular example of this kind would be a main branch divided into two similar side branches. In this case it will be appropriate for the main and side branches to be of the same characteristic impedance except as modified by their respective filters.

Figure 57:
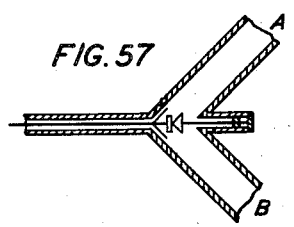

Fig. 57 shows a form of branching that incorporates a non-linear, modulating element. As shown, one of the branches is a conventional form of circuit, in this case a coaxial conductor line. The other branches are hollow pipe guides. By this means one may impress on the non-linear element, through the branches A and B, two high frequencies and obtain in the conventional circuit a frequency equal to the difference of the two higher frequencies as a demodulation product. The process is reversible in such a way as to permit any two frequencies to be impressed on the non-linear device so as to obtain the third as a resultant product. With this statement it will be apparent that Fig. 57 is essentially the same as Fig. 13 except that the straight rectangular guide shown there, is here bent, giving the appearance of two branches.

Figure 58:
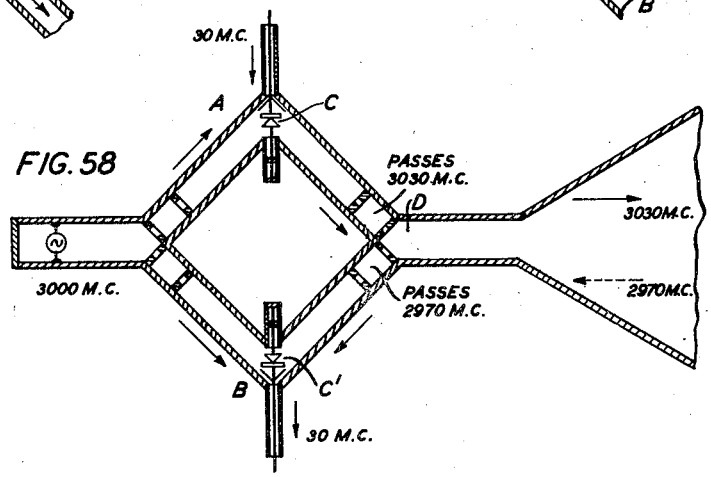

In order to illustrate an application of the above simple principles there is shown in Fig. 58 a method whereby, for example, a single horn or other directive device may be used simultaneously both for receiving and transmitting. The incoming and outgoing channels are made to operate on slightly different frequencies. Moreover, it is possible by this means to use the same oscillator both for transmitting the outgoing channel and for beating in the incoming channel.

In Fig. 58 an oscillator having a frequency of say 3000 megacycles is connected at a branching point to branches A and B as shown in Fig. 56. The branching may be so proportioned that one-fourth of the power is transmitted towards the lower branch while three-fourths is transmitted to the upper. The two filters shown near the junction are not essential but may be helpful in the manner of Fig. 22. At C and C' there are branchings of the type shown in Fig. 57, with non-linear elements. Finally, at point D there is a branch of the type shown in Fig. 56.

Wave power from the oscillator divides, with the larger part taking the upper branch. This latter is impressed on the modulating element at C along with a 30-megacycle intelligence-bearing signal arriving over the coaxial line. This gives rise in the output to several components of which we are most interested in the side-bands near 2970 megacycles and 3030 megacycles. Near the point D is a filter element that rejects both 3000 megacycles and 2970 megacycles but passes 3030 megacycles, thus permitting a single side-band of the modulated power to pass into the outgoing wave guide or horn.

It is assumed that at the same time there is an incoming signal of 2970 megacycles. Upon arriving at the branch point D this is rejected by the 3030-megacycle filter but is passed by the 2970-megacycle filter to the demodulator at C', where it is received along with one-fourth of the 3000-megacycle wave power arriving from the oscillator. This demodulator produces an intermediate frequency output of 30 megacycles that is carried away by the coaxial line. The two filters located near the oscillator are set to pass 3000 megacycles but to reject both 2970 megacycles and 3030 megacycles. The distance of these filters from both the modulator and demodulator should be such that they act as virtual pistons, as discussed with reference to Fig. 22. One is such as to reflect 3030 megacycles back onto itself in such phase as to enhance the transmitted output. The other reflects 2970 megacycles, thereby enhancing the incoming signal to be impressed on the demodulator at C'.

At the remote end of the communication system a similar transmitter and receiver is set up, except that the two filters at D are reversed in position. This results in a single side-band near 2970 megacycles being transmitted and another near 3030 megacycles being received.

Figure 59:
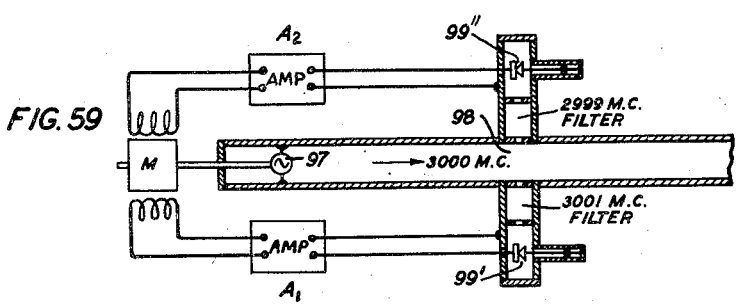

It is apparent that in a system of the type which is here being described it becomes important to maintain the frequency of the various oscillators as nearly constant as possible and this, in general, calls for some regulating means. Fig. 59 shows how the principles just discussed may be used for regulating the frequency of an oscillator. The oscillator 97 is associated with a resonance chamber of such dimensions that there is transmitted either the fundamental of the oscillator or one of its harmonics. In this generator the frequency may be made adjustable by means of a threaded coaxial conductor tuner (not shown) placed across the plate-grid terminals of the vacuum tube. The frequency regulation may be effected by a motor M capable of driving the coaxial tuner inward or outward, as may be necessary, to make the output sensibly constant.

Output from the oscillator 97 normally passes across the branching point 98 to the outgoing guide. However, if the oscillator wanders a short distance above its prescribed frequency a small amount of power is passed by a 3001-megacycle filter into a receiver 99'. If, on the other hand, the oscillator were to wander a short distance below its prescribed frequency a small amount of power would be passed by a 2999-megacycle filter to a receiver 99''. To effect a regulation it is only necessary to connect the outputs of the two side receivers through suitable amplifiers $A_1$ and $A_2$ to two coils of the motor M connected to the coaxial tuner of the oscillator so as to make the motor run forward or backward, as may be needed. This, of course, is but one of several possible methods of using the rectified power at 99' and 99'' to control the oscillator.

To supplement the detailed description of various component parts which has gone heretofore I will now indicate how these may be combined in a typical case with other apparatus well known in the wave guide art to provide a simple one-way communication system. The transmitter end of such a system is shown in block form in Fig. 60. A more complete representation is shown in Fig. 61. The primary oscillator 101 may be considered as producing a carrier frequency of 3020 megacycles. A modulating unit 103 is one of the several types described above, as for example the simple form shown in Fig. 13, but modified for use in a pipe of circular cross section, if desired. In one particular instance such a pipe of internal diameter 7.29 centimeters was used, which has a cut-off for transverse electric waves of 2408 megacycles, thus being of a dimension to support with a comfortable margin the various frequencies in the neighborhood of 3000 megacycles.

The process of modulating 3020 megacycles with a particular band extending from 28.25 megacycles to 31.75 megacycles, as by any of the arrangements of Figs. 7 to 13 and 20 to 38, sets up in the system not only the primary frequencies and their harmonics but also a large number of sum and difference frequencies. Representative of these modulation components are the following frequencies expressed in megacycles: 3020, 2990 and 3050, 2960 and 3080, 2930 and 3110, etc. At a point to the right of the modulator the internal diameter of the pipe was reduced sharply to 5.80 centimeters for a distance of about 30 centimeters. This section 104 cuts off at about 3030 megacycles, thereby excluding from the external line the carrier of 3020 megacycles as well as the lower side-band of 2990 and all other difference components. This leaves the upper side-band located near 3050 megacycles and all other summation components. Finally there is interposed a filter 105 of the type heretofore described and set to pass a narrow band around 3050 megacycles. This excludes the remaining bands of 3080 megacycles and above, leaving a single side-band which extends from 3048.25 megacycles to 3051.75 megacycles. No substantial amount of carrier is transmitted. This single side-band consisting of either a single television channel or of a group of television channels, can now be transmitted either over a wave guide or through an array of electromagnetic horns.

It is worthy of note that when such action as that described above is used reactively to exclude a carrier from transmission, it may be considered like the virtual pistons of Fig. 22 as a means of more effectively impressing wave power onto a modulating unit. The effect is greater when the distances from the point of reaction to the modulating unit and to the closed end of the beating oscillator guide in Fig. 61 are critically adjusted.

The receiver for such a system is shown in Figs. 62 and 63. The incoming signal picked up either by an array of electromagnetic horns or received through a wave guide is led first through a filter 105' which is an exact counterpart of that used as the transmitter. Such a filter tends to keep out of the receiver extraneous noise effects. Power from a beating oscillator is introduced into the wave guide through the coaxial 106. Such beating oscillator power and the incoming wave are impressed on the demodulator crystal 108. The pipe 104' of restricted diameter is useful in preventing beating oscillator power and undesirable demodulation products from escaping back into the wave guide. The demodulator 108 may be a duplicate of the modulator 103 at the transmitting station or any other of the forms described in detail heretofore.

If this receiver is part of a two-way communication system it becomes feasible to take for the beating frequency a small part of the power from the nearby transmitter. In that case the necessary small coupling to the main oscillator may be effected by such means as shown by 106 or by the alternative means shown in Fig. 6.

An effective combination that may be used in this case would be for the east to west transmitter to use a primary oscillator frequency of 3020 megacycles to produce a single side-band in the vicinity of 3050 megacycles. At the corresponding west to east station the same primary frequency is used to produce a side-band in the vicinity of 2990. In case this is done it would ordinarily be necessary for one or the other of the stations to forego the use of the high-pass filter property of a wave guide as a means of limiting the carrier and one of the side-bands. This may readily be done, for the channel filter should under all ordinary circumstances be sufficient for excluding unwanted components from the receiver. Such two-way communication may be set up on either two wave guides, one east bound and one west bound or on a single wave guide. In the latter case due regard must of course be given to the difference in power levels prevailing at the adjacent transmitters and receivers and consequently appropriate frequency spacing must be observed. This is analogous to what was described in connection with Fig. 58.

In this connection it may be noted that a special kind of line filter may be constructed that will pass a series of frequencies such as the above and discriminate against another series falling between those of the first. Such a filter is a modification of that shown at 105 in Fig. 61, the modification consisting in omitting all but the end irises. Such a long chamber is resonant to all frequencies for which an integral number of half waves prevail in its length. In a particular case, for example, one may adjust the total length so that it will resonate with 150 half waves in its length for the frequency of 2900 megacycles. It will then support 151 half waves of the frequency 2920 and 152 half waves of the frequency 2940 and 153 half waves of the frequency 2960. Such a filter permits one to use the same wave guide for two-way operation, such that the east bound channels might be those specified above while the west bound channels might lie midway in their frequency intervals.

Figure 64:
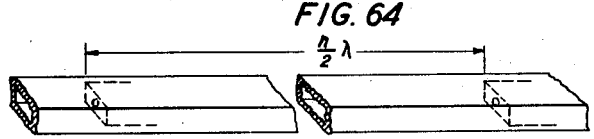
Figure 65:
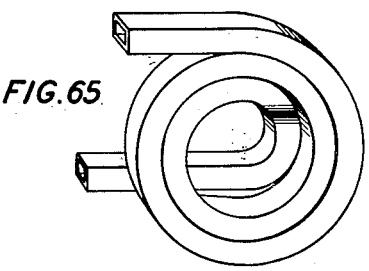

If one were to make the wave in the pipe 15 centimeters for the lowest component to be transmitted, and design the section for 150 wavelengths, it would require about 11 meters of pipe. Such a pipe may extend in the straight direction or may be rolled up in order to conserve space, as shown in Figs. 64 and 65, respectively. Fig. 64 shows a rectangular wave guide section with two irises for the purpose described. The distance between the two irises, represented by $$\frac{n}{2}\lambda$$

is a whole number of half wave-lengths or adjusted slightly therefrom to make such corrections as may be necessary. Fig. 65 shows the same kind of a wave guide section coiled up in a suitable manner for conserving space.

It is an accepted principle of electrical communication that one of the important criteria of a good communication channel is the ratio of signal to noise prevailing at the receiver. If there were no noise we could, theoretically at least, use extremely low power levels. There is, however, a limit to the distance one can go in this direction. Consequently, great care is used in communication practice to guard against the admission of noise. In some instances it is advantageous to use relatively inefficient transducers provided they discriminate effectively against noise. An example of this kind is described below in connection with such wave guide systems as are here being considered.

Figure 66:
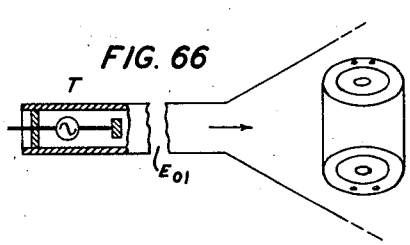
Figure 66A:
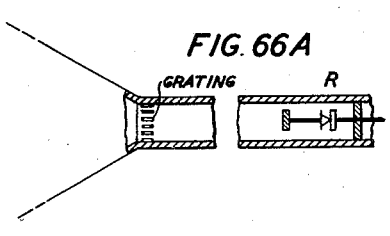

In such a system noise is ordinarily made up of atmospherics such as static, ignition clicks and other electrical discharges. Such noise effects are more likely to be admitted into the system if one uses horns for part of the transmission path. In Figs. 66 and 66A there is shown an arrangement using a particular kind of radio wave which is quite unlike the waves associated with noise. In those figures there is shown a transmitter T and a receiver R. At the transmitter T circular magnetic ($E_{01}$) waves formed in the guide are transmitted from a horn of circular cross section. These waves produce in the space outside the horn a smoke-ring kind of configuration centered on the axis of the horn as indicated in the figure. The receiver R is a similar arrangement oriented to receive these smoke rings along its major axis. These special waves become $E_{01}$ waves in the throat of the horn and are propagated through the connecting wave guide to a receiver element adapted to be responsive to that type of wave. Noise waves, being for the most part an assemblage of plane waves, tend to set up in the throat of the horn $H_{11}$ waves which are either excluded by virtue of special tuning arrangements or fail to register on the $E_{01}$ receiver. Although the method is described in connection with $E_{01}$ waves, it is applicable also to $H_{01}$ waves. A further discrimination against $H_{11}$ waves may be had by placing in the horn or in the throat of the horn a grating made up of a series of short coaxial cylinders of metal for use when $E_{01}$ waves are received and a series of radial conducting spokes for use when $H_{01}$ waves are being received.

Figure 67:
Figure 67A:
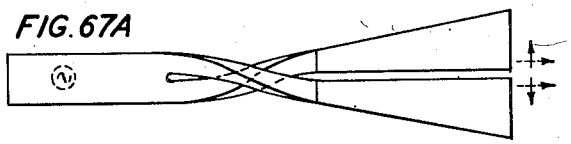

Another method by which a similar form of discrimination may be produced is shown by the horn of Figs. 67 and 67A. The guide and horn associated with a source of $H_{11}$ waves is bifurcated, and the two portions are rotated through 90 degrees in opposite directions thus giving rise to two oppositely phased $H_{11}$ waves from closely adjacent horns. These are received on a similar two-horn arrangement. Since the receiver can respond only to waves that are oppositely phased and symmetrically arranged, noise components reaching the detector are very highly attenuated.

Figure 68:
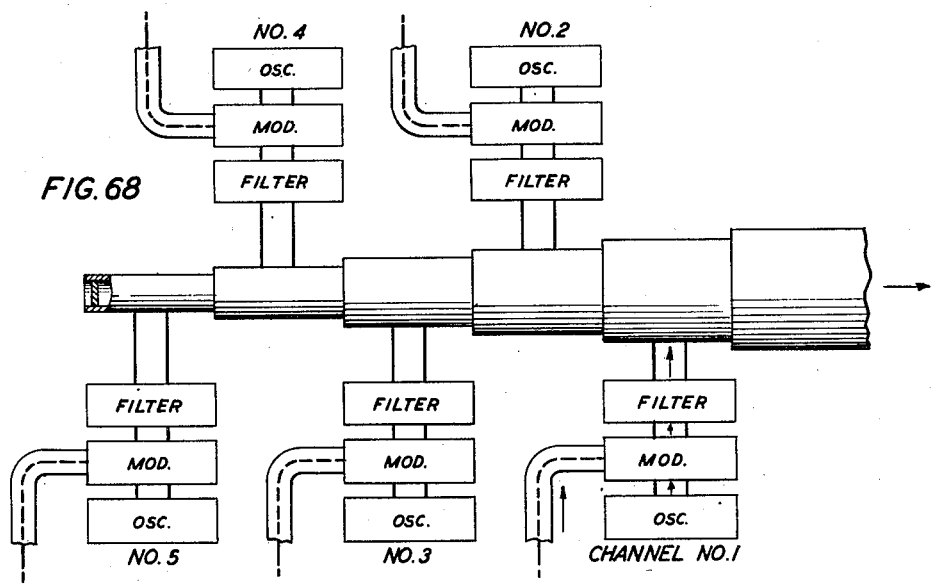
Figure 69:
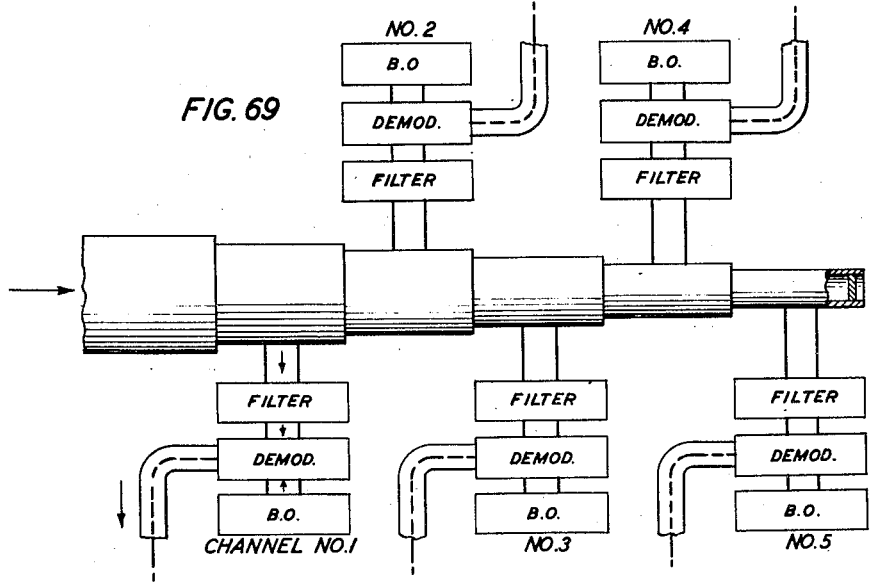

Another arrangement for multiplex transmission is illustrated in Figs. 68 and 69, the first showing the transmitter and the second the receiver. An important feature of the scheme is the frequency allocation to the various branch terminals. Beginning at the branch nearest the main wave guide line the frequencies increase progressively to the last branch channel at the end of the line. At the same time I reduce progressively the diameter of the main line step by step as each branch takes off. The reductions are so calculated as to transmit all frequencies above that limit prevailing in that particular branch but to reject all frequencies below that limit. This has the effect of excluding from the high frequency branches all lower frequencies, thereby reducing the burden on the various channel filters. Also, the various carrier frequencies are so chosen that unwanted components of one channel do not coincide with the wanted components of another channel. The length of each step is not critical but should preferably be several wavelengths. In such a system I would recommend a channel separation of 20 megacycles, even though the transmitted band width is but 3.5 megacycles. Such prodigality is permissible at present because of the great band space available. The latter, of course, is characteristic of the high frequency region in which a dielectric wave guide system operates. Recent laboratory experiments have shown that while the allocation here shown simplifies the design of such a multiplex system, spacings of the same order as the band width itself may readily be used.

While the guide terminals of Figs. 68 and 69 are shown as circular in cross section, it is to be understood that this is for simplicity only and that the guides may take on any desired form, such as rectangular. Also, in Fig. 68, again for simplicity, the signal band is indicated as coming into the modulator element on a section of coaxial cable while the connection from the high frequency oscillator to the modulator and the connection from the modulator through the filter to the wave guide are shown symbolically only as consisting of wire pairs. Actually in practice it would be preferable to have these latter connections consist of sections of coaxial cable or sections of wave guide appropriate for the frequencies which are to be transmitted. In the latter case the modulating signal, the carrier frequency and the modulator output would be related to each other in the manner and through the type of arrangements shown and described in connection with such Figures as 13 and 23 to 33. If, in addition, it is desired to obtain balanced modulation, that is modulation with carrier elimination, then it is to be understood that the modulators of Fig. 68 may be such arrangements as are described in connection with Figs. 34 to 38. More specifically for each transmission channel of Fig. 68 there could be a unit such as that of Fig. 61, all of the units being associated in proper sequence with the tapered guide. The filters shown in the paths of the individual high frequency signal channels might be such as to limit the band of transmission to one side-band, if desired, and the filters would take on the characteristics of such filters as described in connection with Figs. 60 to 63. Similarly at a receiving terminal, such as that of Fig. 69, the association of the incoming modulated signal, the locally generated beating oscillator and the signal output are related in a manner entirely analogous to that described in connection with Fig. 68 and shown in further detail in Fig. 63. Furthermore, at any of the points in the system where there is branching of the wave guide, the conditions of impedance matching referred to in connection with Figs. 54 to 58 should be borne in mind. Also while the system of Figs. 68 and 69 is shown as multiplex for one-way transmission, it is clear from what has been said heretofore that any one of the transmitting units in Fig. 68 may be converted into a receiving unit, and that any one of the receiving units in Fig. 69 may be converted into a transmitting unit. Thus the system becomes a two-way transmission system.

What is claimed is:

1. A modulation system comprising a hollow pipe guide and four irises spaced apart in said guide to form a pair of filters and a chamber between the filters, a beating oscillator coupled through one portion of said pipe guide and one of said filters to said chamber, a side-band path comprising another portion of said pipe guide coupled through the other of said filters to said chamber, a circuit including a modulating element disposed within said chamber, said one filter constituting a reflector of waves of side-band frequency and being positioned for maximum translation of side-band power between said side-band path and said circuit, said other filter constituting a reflector of waves of beating frequency and being positioned for maximum translation of beating power between said circuit and said beating oscillator.

2. A modulation system in accordance with claim 1 in which said circuit includes a tuner.

3. A system in which two high frequency electromagnetic waves and a relatively low frequency wave are interrelated in a modulation process, said system comprising a chamber adapted to support the two high frequency waves, a circuit for said low frequency wave including a modulating element coupled with the waves in said chamber, said chamber being bounded in part by a pair of filters each adapted to freely pass a respective one of said high frequency wave and to substantially completely reflect the other, and two transmission paths, external of said chamber and respective to the said two high frequency waves, coupled to said chamber through a respectively corresponding one of said filters.

4. A modulation system comprising a conductively bounded enclosure adapted to support electromagnetic waves of high frequency, modulating means disposed in coupling relation to the waves in said enclosure, means comprising a first shielded transmission path electrically coupled to the interior of said enclosure for transmitting carrier waves thereto, means comprising a second shielded transmission path electrically coupled to the interior of said enclosure for transmitting thereto or therefrom signal-modulated waves to be received or transmitted, respectively, a signal transceiver coupled to said modulating means, said first transmission path including selective reflector means substantially transparent to said carrier waves but adapted to substantially completely reflect said signal-modulated waves whereby said signal-modulated waves are prevented from escaping through said first path, and said second transmission path including selective reflector means substantially transparent to said signal-modulated waves but adapted to substantially reflect said carrier waves.

5. An electric wave modulation system comprising a conductively bounded chamber, two shielded microwave transmission paths extending from the said chamber and communicating with the interior thereof, respective frequency-selective wave translating means effectively disposed in each of said paths adjacent said chamber, the said respective translating means being substantially transparent to waves of respective different frequencies and relatively opaque to waves of the frequency to which the other is transparent, and modulating means coupled to the interior of said chamber.

6. A modulation system comprising a conductively bounded chamber adapted to support electromagnetic waves of high frequency, two shielded wave transmission paths coupled to said chamber, modulating means in energy transfer relation with the waves appearing in said chamber, each of said paths including frequency-selective means for freely passing waves of a frequency respective to that path and substantially completely reflecting waves of a frequency respective to the other of said paths, each of said frequency-selective means being spaced from said modulating means a distance that is favorable to maximum energy transfer between said modulating means and the waves passed by the other of said frequency-selective means.

7. A modulation system comprising, in combination, electromagnetic wave modulating means, means for freely transmitting carrier waves to said modulating means, means for freely transmitting to or from said modulating means signal-modulated waves to be received or transmitted, respectively, and a signal transceiver connected to said modulating means, at least one of said wave transmitting means including selective means for substantially completely reflecting the said waves transmitted by the other of said transmitting means at a point that is spaced from said modulating means a distance favorable to efficient coupling between said other wave transmitting means and said modulating means.

8. A modulation system comprising, in combination, electromagnetic wave modulation means, a carrier wave source, a first wave transmission path connected to said source for impressing carrier waves on said modulating means, a second wave transmission path for impressing on said modulating means, or conveying therefrom, signal-modulated waves, a signal source or receiver connected to said modulating means, said first wave transmission path comprising selective means for substantially completely rejecting said signal modulated wave at a point adjacent said modulating means, and said second wave transmission path comprising selective means for substantially completely rejecting said carrier waves at another point adjacent said modulating means, each of said selective means being substantially transparent to the said waves rejected by the other.

9. An electric wave modulation system comprising a conductively bounded enclosure, a carrier wave generator, a modulating wave source, means in said enclosure for modulating the carrier wave from said generator with the modulating wave from said source, wave transmission means for carrying away from said enclosure the modulated wave produced by said modulating means, said wave transmission means comprising means transparent to said modulated wave for substantially completely reflecting said carrier wave at a point that is at least approximately an odd number of quarter wavelengths removed from said modulating means.

10. A system in accordance with claim 3 in which said filters are spaced from said circuit for impedance matching between said circuit and said paths.

11. In a system involving two high frequency electromagnetic waves, a low frequency wave and intermodulation of two of said waves to produce the third, a conductively bounded chamber adapted to sustain said two high frequency waves, wave translating means at opposite ends of said chamber each adapted to pass substantially unimpeded a respective one of said high frequency waves, at least one of said last-mentioned means constituting a substantially complete reflector of the waves passed by the other, and a modulating element circuit-coupled to the interior of said chamber.

12. A combination in accordance with claim 11 in which each of said last-mentioned means constitutes a substantially complete reflector of the waves passed by the other.

13. In a system involving two high frequency electromagnetic waves, a low frequency wave and intermodulation of two of said waves to produce the third, a conductively bounded chamber having at one end a pair of spaced reactors constituting means for passing one of said high frequency waves and reflecting the other, said chamber having at its other end a third reactor comprising means for passing the other of said high frequency waves, and a circuit for said low frequency wave, said circuit comprising a modulating element and extending within said chamber.

14. In a system involving two high frequency electromagnetic waves, a low frequency wave and intermodulation of two of said waves to produce the third, a conductive-walled chamber having ends in the form of irises, respective transmission paths for said high frequency waves each coupled to said chamber through a respective one of said irises, a transceiver for said low frequency wave, a modulating element and a circuit connecting said transceiver and said modulating element, said circuit extending into said chamber in coupling relation with the high frequency waves therein, each of said irises being positioned for at least approximately maximum coupling, between said circuit and the transmission path associated with the other of said irises, with respect to the high frequency waves respective to the said last-mentioned path.

15. In combination, a hollow pipe-like conductive-walled chamber having reactors at opposite ends thereof and a hollow pipe guide forming a continuation of said chamber at each of said ends, electromagnetic wave translating means coupled to an intermediate point of said chamber, said guides carrying waves of respectively different frequencies and said reactors being spaced from said intermediate point for substantially maximum transfer of wave power between said translating means and said guides.

16. An electric wave system comprising a first transmission path carrying waves of one high frequency, a second transmission path carrying waves of a second high frequency, a third transmission path, and means coupling said first and second paths in wave energy transfer relation with said third path and in relatively conjugate relation to each other, said coupling means comprising a conductively bounded chamber having openings through which said first and second paths are respectively coupled in bilateral wave transfer relation with the interior of said chamber and means interposed in each of said first and second paths adjacent said openings forming respective filters each tuned to exclude waves of the frequency carried by the other of said paths, and circuit means coupling said third path to a point within said chamber.

17. An electric wave system comprising three distinct wave transmission paths coupled in mutual impedance relation at a common junction, a respective wave-permeable reactor in each of two of said paths electrically adjacent said junction, means for transmitting waves of one frequency between one of said two paths and the third path via said junction, and means for transmitting waves of another frequency between the other of said two paths and said third path via said junction, said reactors being critically spaced from said junction to minimize direct transmission between said first and second paths for at least one of said frequencies.

18. A system comprising a chamber adapted to support electromagnetic waves of high frequency, said chamber having at least two openings for the passage of waves, two transmission paths carrying waves of respective different frequencies, and coupling means individual to said paths coupling each to the interior of said chamber through a respective one of said openings, each of said coupling means comprising means associated with the respectively corresponding opening and defining a resonance chamber tuned to relatively impede transmission of the waves carried by the other of said paths.

19. A modulation system comprising a modulation chamber, a non-linear device coupled to the interior thereof, two wave transmission paths carrying respectively different high frequencies, individual coupling means connecting each of said paths with said modulation chamber, each of said coupling means having a frequency selective characteristic favoring transmission of the frequencies carried by the respective said transmission path connected thereto, and each of said coupling means comprising a resonance chamber contiguous with said modulation chamber and in coupled relation therewith.

20. A system for the transmission of microwaves comprising a first chamber, means having a non-linear voltage current characteristic electrically coupled to the interior of said chamber, two resonance chambers each contiguous with and coupled to said first chamber, and two microwave transmission paths coupled to said first chamber through a respective one of said resonance chambers.

21. In a system for the transmission of high frequency electromagnetic waves, a substantially closed conductively bounded chamber, a pair of shielded wave transmission paths each opening into said chamber, and a resonator interposed in each of said paths adjacent said chamber.

22. In combination, a substantially closed conductively bounded chamber, two shielded paths for the transmission of high frequency electromagnetic waves, and means coupling said shielded paths individually to the interior of said chamber comprising respective space resonance devices.

23. A combination in accordance with claim 22 in which said resonance devices are resonant to respective different frequencies.

24. A combination including three conductively bounded chambers, one of said chambers having an apertured boundary portion in common with each of the other of said chambers, and means for exciting said chambers with electromagnetic waves having a high frequency that at least approximates the space resonance frequencies of said chambers, the apertures in the said common boundary portions being of a size to provide a substantial bilateral electrical coupling between said one chamber and each of said other chambers.

25. A combination in accordance with claim 24 comprising electromagnetic wave translating means directly coupled to the interior of one of said chambers.

26. In combination, two substantially closed conductively bounded chambers adapted to support high frequency electromagnetic waves, said chambers having an apertured boundary portion in common whereby they are electromagnetically coupled to each other, and means for exciting electromagnetic waves in said chambers, at least one of said chambers having a space resonance frequency that is of the same order as the frequency of said waves.

27. In combination, a pair of hollow, conductively bounded space resonators tuned to electromagnetic waves of respective different frequencies, and a conductively bounded chamber coupled to both of said resonators.

28. In combination, a pair of hollow, conductively bounded chambers resonant to electromagnetic waves of respective different high frequencies, a shielded connection between the two chambers, and modulating means coupled to the interior of said shielded connection.

29. A pipe-like uniconductor guide for ultra-high frequency electromagnetic waves and at least two adjacent transverse apertured conductive diaphragms spaced apart in said guide, the portion of guide between said diaphragms containing substantially only a dielectric medium.

30. In combination, two sections of hollow pipe guide for high frequency electromagnetic waves, an apertured conductive transverse partition in each of said guide sections, and means including both of said partitions defining a conductively bounded resonant electrical cavity.

31. In combination with a pair of conductively bounded structures each adapted to sustain high frequency electromagnetic waves therein, an electromagnetic space resonance device comprising a hollow, substantially closed, conductively bounded chamber, said chamber having an individual apertured boundary portion in common with each of said first-mentioned structures whereby said space resonance device is electromagnetically coupled with each of said conductively bounded structures.

32. In combination, a hollow pipe guide for electromagnetic waves, said guide having apertured transverse conductive partitions spaced apart therein to define a succession of aperture-coupled, substantially closed, conductively bounded chambers, the interior of at least one of said chambers being substantially devoid of electromagnetic wave generating-or-absorbing means, and means for exciting high frequency electromagnetic waves in said chambers.

33. A substantially prismatic conductively bounded chamber with irises defining the ends thereof, electromagnetic wave translating means within the chamber, two wave transmission paths each coupled to said chamber through a respective iris, said irises being spaced from said translating means for maximum wave power transfer between said translating means and said transmission paths at different frequencies respective to the different said transmission paths.

34. A modulation system comprising means defining a conductively bounded chamber having two openings for the passage of high frequency electromagnetic waves, filter means respective to the two openings each substantially opaque to waves of a frequency freely passed by the other, and a distorting device coupled to the interior of said chamber.

35. A modulator comprising an elongated conductively bounded chamber with a band-pass filter at each end thereof, said filters being adapted to pass beating and side-band oscillations, respectively, and each adapted to reject the said oscillations passed by the other, and a non-linear element coupled to said chamber at a point between said filters.

36. A modulator comprising a conductively bounded hollow chamber, a distorting device coupled to the interior of said chamber, said chamber having opposite openings therein for the passage of high frequency electromagnetic waves to or from said distorting device, and frequency-selective means at one of said openings tuned to pass waves of one frequency and to reject waves of another frequency.

37. In combination, a hollow pipe guide for high frequency electromagnetic waves, a pair of filters spaced apart in said guide and bounding a chamber between them, wave translating means within the chamber, said filters being substantially transparent to waves of respective different frequencies and each of said filters being substantially opaque to waves of a frequency respective to the other.

38. A modulator comprising hollow pipe guides for beating oscillations and side-band oscillations, respectively, a signal circuit, a distorting device coupled to said guides and circuit, said modulator including conductively bounded space resonance means interposed between said guides and tuned to inhibit escape of said oscillations from one to the other of said guides.

39. A modulation system comprising three transmission branches two of which are adapted for connection with a source of beating oscillations and a source or receiver of side-bands, respectively, and the third of which is adapted for connection with a source or receiver of signals to be impressed or derived, a non-linear device coupled to all of said branches, and chamber means inhibiting coupling between said two branches for side-bands and beating oscillations.

40. A modulator comprising a section of hollow pipe guide for the transmission of high frequency electromagnetic waves therein, three electrically adjacent shunt wave permeable reactance means spaced apart within said guide, and a non-linear device coupled to said guide and connected in electric circuit relation to the intermediate of said reactance means.

41. Two tandem related paths for the transmission of ultra-high frequency waves of respectively different predetermined frequencies, wave translating means coupled to both of said paths at their junction, and means for relatively impeding transmission between said paths at said frequencies comprising a pair of reactors each disposed in a respective one of said paths and each spaced from said translating means a distance functionally related to the predetermined frequency respective to the other path.

42. Two tandem related paths for the transmission of high frequency electromagnetic waves, wave translating means coupled to both of said paths at their junction, a pair of frequency selective transducers each interposed in a respective one of said paths, said transducers being substantially transparent to respective different wave frequencies and each being relatively opaque to the wave frequency respective to the other, and each of said transducers being spaced from said junction a distance functionally related to the wave frequency respective to the other.

43. A combination in accordance with claim 42, in which more particularly the spacing of each of said transducers from said junction is substantially optimum for maximum wave power transfer between said translating means and the said transmission path in which the other of said transducers is interposed.

44. In combination, a conductively bounded path for the transmission of high frequency electromagnetic waves, wave filter means interposed in said path, said filter means being substantially transparent to transmitted waves of a first frequency and a substantially opaque reflector of transmitted waves of a second frequency, and means for exciting or receiving said waves of the second frequency, said exciting or receiving means being coupled to said path at a point electrically adjacent said filter means.

45. In combination, a transmission line, wave translating means for exciting in said line or receiving therefrom high frequency electromagnetic waves of predetermined frequency, frequency selective wave filter means in said line adjacent said exciting or receiving means, said frequency-selective means being a rejector of said waves of predetermined frequency and relatively transparent to waves of other frequency, and said translating means and said frequency-selective means being spaced for substantially maximum wave power transfer, at said predetermined frequency, between said translating means and said line.

46. In a microwave transmission system utilizing electromagnetic waves of two substantially different frequencies, a pair of wave transducers, a wave transmission structure connecting said transducers, one of said transducers being substantially transparent to transmitted waves of a first frequency and the other of said transducers being substantially transparent to transmitted waves of a second frequency, each of said transducers being adapted to substantially completely reject waves of the said frequency to which the other of said transducers is substantially transparent, and wave translating means for exciting or absorbing waves of the first and second frequency, said translating means being coupled to said wave transmission structure electrically adjacent to both of said transducers.

47. A combination in accordance with claim 46 in which more particularly the spacing between each of said transducers and said translating means is at least approximately an odd number of quarter wavelengths as measured in terms of the wavelength of the waves to which the said transducers are respectively transparent.

48. A modulator adapted for high frequency electromagnetic waves comprising a conductive-walled chamber bounded in part by a pair of reactors, a non-linear device in the said chamber, and a pair of wave guides each individually coupled to said chamber through a respective one of said reactors.

49. Ultra-high frequency apparatus comprising first and second coaxial line elements connected together at a junction point, means for producing an ultra-high frequency potential difference between the inner conductors of said coaxial line elements and the outer conductors thereof at said junction point, and an energy utilization device coupled to said coaxial line elements at said junction point and responsive to ultra-high frequency currents in the inner conductors of said first and second coaxial line elements.

50. A mixer multiplier, comprising in combination a high frequency input transmission line, a low frequency input transmission line, interconnecting means extending therebetween, and non-linear means in said interconnecting means for producing a harmonic of the frequency supplied through the low frequency input transmission line.

51. Apparatus as in the preceding claim, further including a heterodyne output connection for extracting heterodyne energy from said nonlinear means.

52. A frequency changer, comprising in combination an input transmission line designed for fundamental frequency input, an output transmission line coupled thereto, an interposed nonlinear circuit means for introducing harmonics, the output transmission line having such dimensions as to cut off wavelengths longer than that of a predetermined frequency that is higher than that of the fundamental frequency input.

53. A microwave frequency increaser, comprising in combination a wave guide, a coaxial transmission line joined transversely to said wave guide, but having an inner conductor extending through said wave guide, a crystal rectifier in series with said inner conductor, and a connection for supplying fundamental frequency energy to said coaxial transmission line whereby higher frequency energy derived therefrom is supplied to said wave guide.

54. A microwave frequency increaser comprising, in combination, a hollow pipe wave guide, a tubular conductor opening into said wave guide, a further conductor within said tubular conductor forming a coaxial transmission line therewith and extending transversely across said hollow pipe wave guide, a crystal rectifier connected in series with said further conductor, means for supplying ultra high frequency energy to said crystal rectifier, and means for tuning said coaxial line to control the current distribution along the portion of said further conductor extending across said wave guide.

55. Apparatus as in claim 53 including a source of direct current bias in series with said crystal.

56. A frequency changer comprising in combination, a transmission line with an energy input connection for waves of a first frequency and an energy output connection for waves of a higher frequency, transverse transmission lines joined to said first-mentioned transmission line, said last-mentioned transmission lines being of the coaxial type, each including a respective nonlinear circuit element and being coupled to the first-mentioned transmission line input.

57. A frequency changer, comprising in combination a high frequency input transmission line, a low frequency input transmission line, a transmission line connecting the two, and a heterodyne output connection from said connecting transmission line, one of said lines including a nonlinear circuit element.

GEORGE C. SOUTHWORTH.

REFERENCES CITED

The following references are of record in the file of this patent:

UNITED STATES PATENTS

| Number | Name | Date |
| --- | --- | --- |
| 2,106,769 | Southworth | Feb. 1, 1938 |
| 2,142,159 | Southworth | Jan. 3, 1939 |
| 2,153,728 | Southworth | Apr. 11, 1939 |
| 2,216,170 | George | Oct. 1, 1940 |
| 2,223,058 | Christ | Nov. 26, 1940 |
| 2,252,589 | Southworth | Aug. 26, 1941 |
| 2,253,503 | Bowen | Aug. 26, 1941 |
| 2,408,420 | Ginzton | Oct. 1, 1946 |